FIG. 25 BASIC BUSY TRIGGER & CYC INH TIMING

April 9, 1968 W. P. WISSICK ET AL 3,377,579
PLURAL CHANNEL PRIORITY CONTROL
Filed Jan. 13, 1967 20 Sheets-Sheet 20
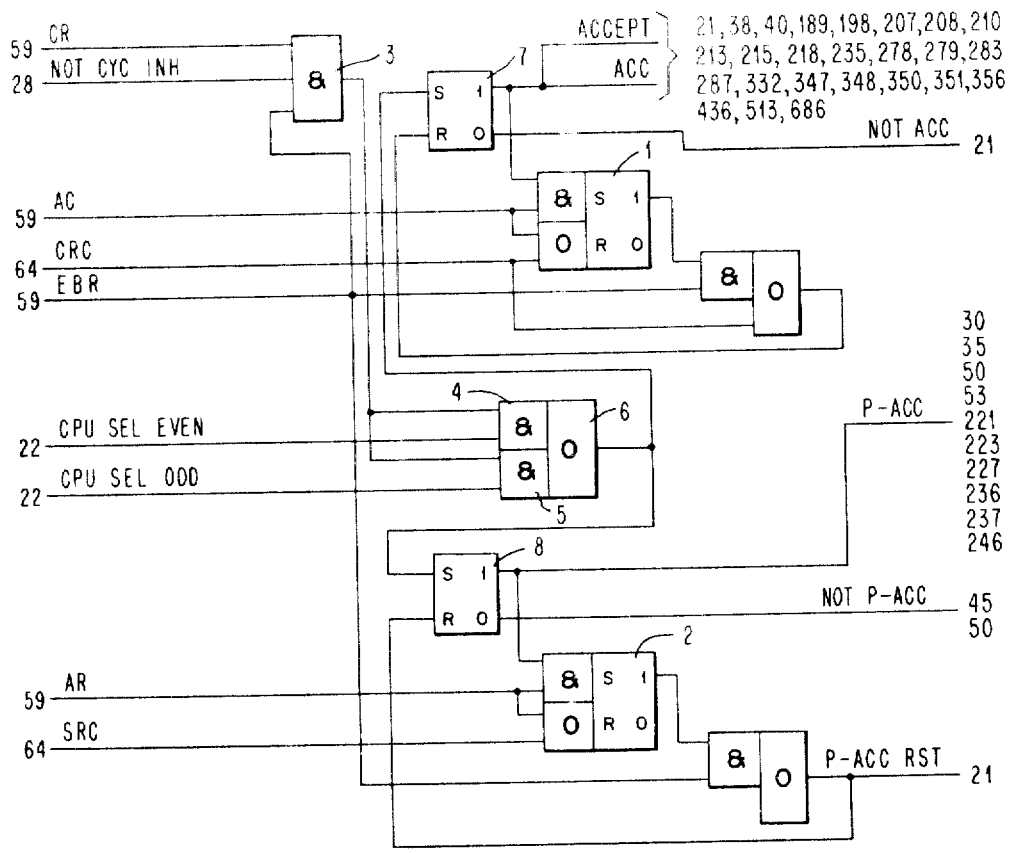
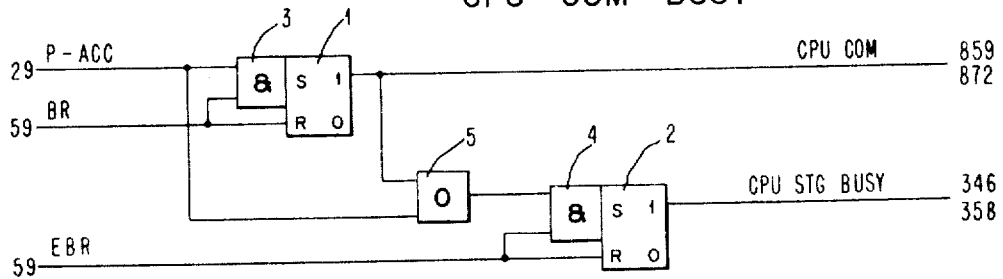

United States Patent Office 3,377,579
Patented Apr. 9, 1968

---

3,377,579
PLURAL CHANNEL PRIORITY CONTROL
William P. Wissick, Sunnyvale, Calif., and James M. Litz, Kingston, N.Y.; Gladys M. Litz, executrix of said James M. Litz, deceased, assignors to International Business Machines Corporation, Armonk, N.Y., a corporation of New York
Continuation-in-part of application Ser. No. 445,319, Apr. 5, 1965. This application Jan. 13, 1967, Ser. No. 609,254
2 Claims. (Cl. 340—172.5)

---

ABSTRACT OF THE DISCLOSURE

The specification discloses an illustrative embodiment for the invention comprising a large scale data processing system of the type which is composed of a plurality of quasi-independent units. The environmental data processing system includes a central processing unit or portion, which is herein referred to as a CPU, a plurality of storage units, a plurality of input/output control devices referred to herein as channels, as well as control and maintenance facilities which are found in a power distribution unit, herein referred to as a PDU. The CPU of the environmental system includes a control or instruction unit hereinafter referred to as an I unit, and an arithmetic and logic or execution unit, hereinafter referred to as an E unit. The I unit includes controls for instruction fetching, branching, interruption handling, communication with the input/output channels, and other related functions. The E unit of the environmental system can perform algebraic and logical operations, moving, shifting, and other functions.

---

This application is a continuation-in-part of application Ser. No. 445,319, filed Apr. 5, 1965, now abandoned, entitled "Channel Priority Delay Circuit."

TABLE OF CONTENTS

| | Col. |
|---|---|
| (1.0) Background of the Invention | 2 |
| (2.0) References | 4 |
| (3.0) Nomenclature | 4 |
| (4.0) Brief Description of Environmental System (FIG. 2) | 6 |
| (5.0) Component Circuits (FIG. 3 Through FIG. 8) | 7 |
| (6.0) Basic Bus Control Unit | 9 |
| (6.1) Selection Circuits | 9 |
| (6.1.1) Channel Priority (FIG. 9) | 9 |
| (6.1.1.1) Channel Priority Circuit (FIG. 12) | 10 |
| (6.1.1.2) Buffer Circuit (FIG. 13) | 11 |
| (6.1.1.3) Delay Circuit (FIG. 14) | 12 |
| (6.1.1.4) BCU Data Request Circuit (FIG. 15) | 12 |
| (6.1.1.5) BCU Response (FIG. 16) | 13 |
| (6.1.2) Channel Selection, Generally (FIG. 9) | 13 |
| (6.1.2.1) Channel Request Circuit (FIG. 17) | 13 |
| (6.1.2.2) Channel Even/Odd Selection (FIG. 18) | 15 |
| (6.1.3) CPU Selection, Generally (FIG. 9) | 16 |
| (6.1.3.1) CPU Request Circuit (FIG. 21) | 16 |
| (6.1.4) CH CPU Selection Circuits, Generally (FIG. 9) | 18 |
| (6.1.4.1) Channel-CPU Selection A/B-Even/Odd (FIG. 27) | 18 |
| (6.1.4.2) Busy, Positive Select and Inhibit Circuits (FIG. 28) | 19 |
| (6.1.4.3) Accept Circuit (FIG. 29) | 19 |
| (6.1.4.4) CPU Communicate-Busy Circuit (FIG. 30) | 20 |
| (6.1.5) Storage Address Register (FIG. 23) | 21 |
| (6.1.6) Summation of Selection Circuits | 21 |

The foregoing and other objects, features and advantages of the invention become more apparent in the light of the following detailed description of a particular embodiment thereof as shown in the accompanying drawings. The drawings are illustrative block diagrams, schematic block diagrams, timing diagrams, charts and illustrations of an embodiment of the present improvement, as set forth in a Large Scale Data Processing System which is referred to as "said environmental system," as set forth in the following list:

TABLE OF FIGURES

Figure 1:
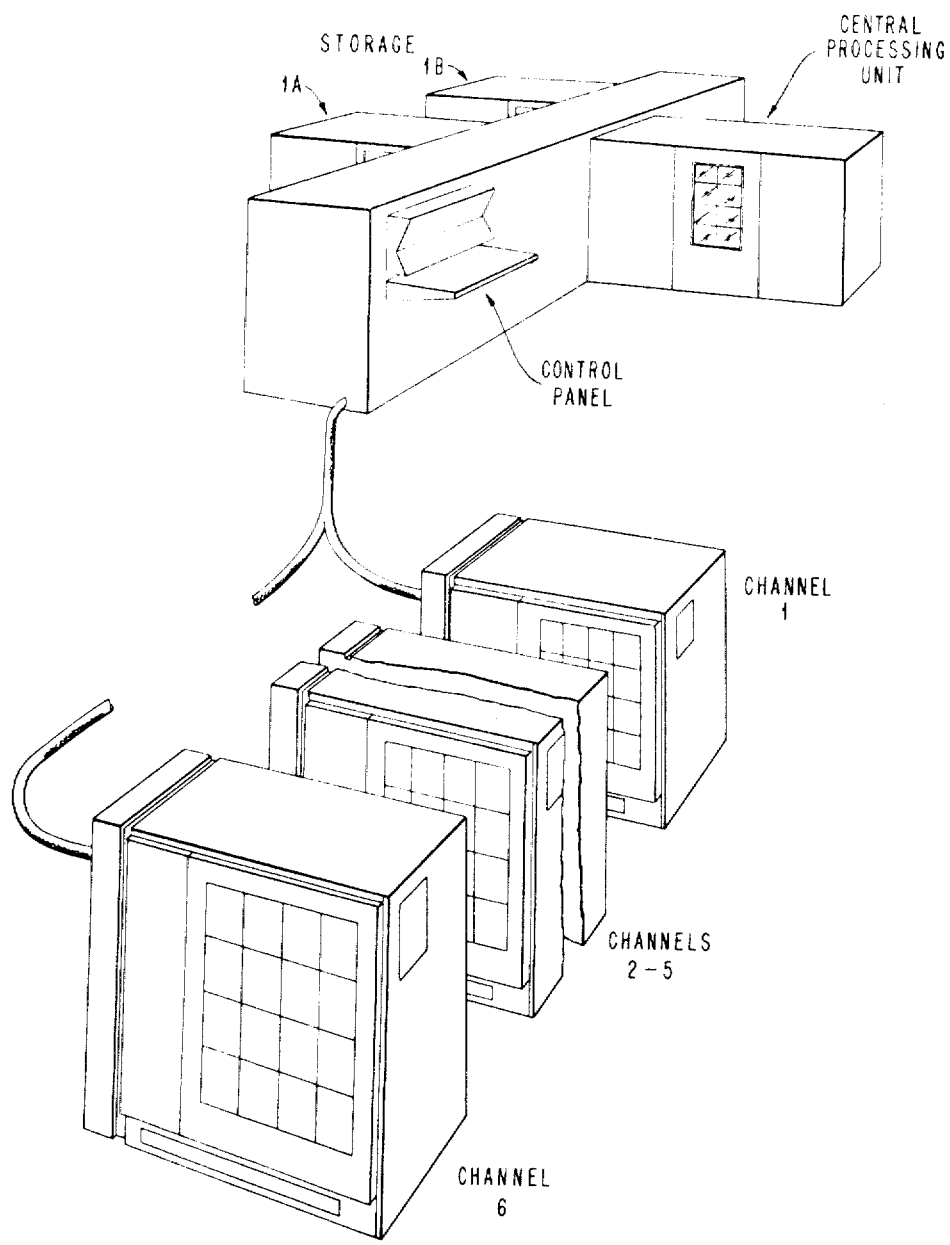

| | Sheet |
|---|---|
| (FIG. 1) System Illustration | 1 |
| (FIG. 2) Environmental System | 2 |
| (FIGS. 3a–5b) Component Circuits | 3 |
| (FIGS. 6a–8b) Component Circuits | 4 |
| (FIG. 9) Selection Circuits | 5 |
| (FIG. 10) Storage Input Circuits | 6 |
| (FIG. 11) Storage Output Circuits | 7 |
| (FIG 12) CH PRI | 8 |
| (FIGS. 13–15) BFR, Delay, BCU Data REQ | 9 |
| (FIGS. 16–18) BCU Response, CHAN Request, Gate CH/CPU | 10 |
| (FIG. 19) Basic CH REQ CYC | 11 |
| (FIG. 20) Basic CPU CYC | 12 |
| (FIG. 21) CPU REQ | 13 |
| (FIG. 22) CPU E/O | 13 |
| (FIG. 23) SAR | 14 |
| (FIG. 24) CPU REQ CT | 15 |
| (FIG. 25) Busy & CYC INH Timing | 16 |
| (FIG. 26) CH-CPU Interplay | 17 |
| (FIG. 27) SEL A/B-E/O CH-CPU | 18 |
| (FIG. 28) Busy-POS SEL-INH | 19 |
| (FIG. 29) Accept | 20 |
| (FIG. 30) CPU COM-Busy | 20 |
| FIG. 31–FIG. 876 are illustrative of figures in said environmental system and are contained in application Ser. No. 609,238, filed Jan. 13, 1967 | 21–643 |

(1.0) BACKGROUND OF THE INVENTION

This invention relates to data processing and more particularly to means for controlling the rate at which priority assignments are made to asynchronous devices from which storage requests are received.

In the data processing art, the provision of semi-independent input/output control devices (hereinafter referred to as "channels") has resulted in various methods of permitting channels controlled access to a storage facility of the system. Channels are frequently operated asynchronously with central processing units, so that the control of channel accessing of a storage device may require special timing considerations. In some systems, the channels and the CPU are permitted access to the storage devices at such a repetition rate of access that the asynchronous nature of the channel poses no problem. In other cases, absolute response from any unit is sufficient so that a complete unit of storage accessing is achieved through the same device for subsequent storage cycles. In other systems, buffer storage may be provided in order to register any requests which have been made, and is needed in order to permit the next succeeding step by that unit in the timely, continuous servicing of the highest priority request which has been set in a register. In other devices, a channel may be assigned a specific time in which it could make its access, without foreshortening of time in the event a particular channel did not desire access. Time division multiplexing, with a poling of the stations in prior order, has been utilized to a great extent in the art.

In all of the foregoing methods of allotting priority, and providing basic accessing rate control, the priority allotting circuits have certain disadvantages such as unduly prolonging the time required for a channel device to achieve a storage reference, duplicity of hardware, complex logical control circuits, et cetera.

An object of the present invention is improved storage accessing control apparatus. Other objects of the invention include the following:

Provision of a maximum rate timing apparatus;

Provision of a timing apparatus permitting rapid responses;

Provision of a timing apparatus permitting minimum lost time between responses thereof;

Provision of an improved storage accessing control;

Provision of an apparatus for handling asynchronous responses;

Provision of an improved function-responsive timing means;

Provision of a delay unit arrangement for a timing apparatus.

In accordance with the present invention, a plurality of devices are connected so as to operate a single apparatus, the acceptance of a device for handling by the apparatus controlling the start of the timing mechanism thereof, the timing characteristic of the mechanism being dependent upon the particular apparatus to be serviced thereby.

One embodiment of the invention comprises a bus rate control in which any one of six channels may set a latch indicating that it wants to make a storage reference. The lowest numbered channel which has set a latch will be granted priority. Therefore, only one of six outputs of the priority circuit will be energized, and this one will eventually be timed with the output of a delay circuit to cause a response to the channel. Any one of the outputs of the priority circuit will, through an OR circuit, set a buffer trigger, the off side of which is applied to the gates of the latches so that no further requests can be sensed. The buffer trigger starts a delay circuit which has six delay units, concurrent outputs of which is called "delay full." The various delay outputs are used to time the responses to the particular, selected channel, the close-in channels being gated later than the far-out channels so that responses, from the channel back to the BCU, will all be received within the same range of time. Before such responses can be received back at the BCU, the channel request is used to gate the setting of the CH REQ latch which in turn will reset the buffer trigger and the six input latches so that a further request can be made; in other words, the next channel request is prepared for as soon as is possible without losing the information necessary to send out responses for the current channel request.

The essence of one feature of this invention is using the delay line to time the responses to the channel, the close-in channels being responded to later than the far-out ones, so that the return address and data information from the selected channel will be received by the BCU within an acceptable time range without regard to which channel is sending it; coupled with this is the use of the output of the delay circuit for setting the channel request (which then resets the entire priority circuit, notably the latches and the buffer trigger), at a time (delay full) which is definitely related to the setting of the buffer trigger in a current case, and definitely not caused by an earlier case which set it in the first place. This thereby permits getting ready for the next channel request as soon as is possible without doing it so soon as to ruin the necessary information for the current channel request. Without this capability, the exemplary bus rate for channels could not be achieved without channel 1 interfering with channel 6.

The invention comprises connecting slower and faster channels to the same channel priority circuit, there being a minimum of dwell time between the beginning of one recognition cycle and the beginning of a subsequent recognition cycle, which together with the overlapping of functions achieved thereby makes it possible for a maximum repetition rate in assigning priority and responding to channel requests recognized by a priority apparatus.

The foregoing and other objects, features and advantages of the present invention will become more apparent in the light of the following detailed description of an illustrative embodiment thereof, as shown in the accompanying drawings.

The description of the drawings immediately follows the table of contents, hereinbefore.

Figure 9:
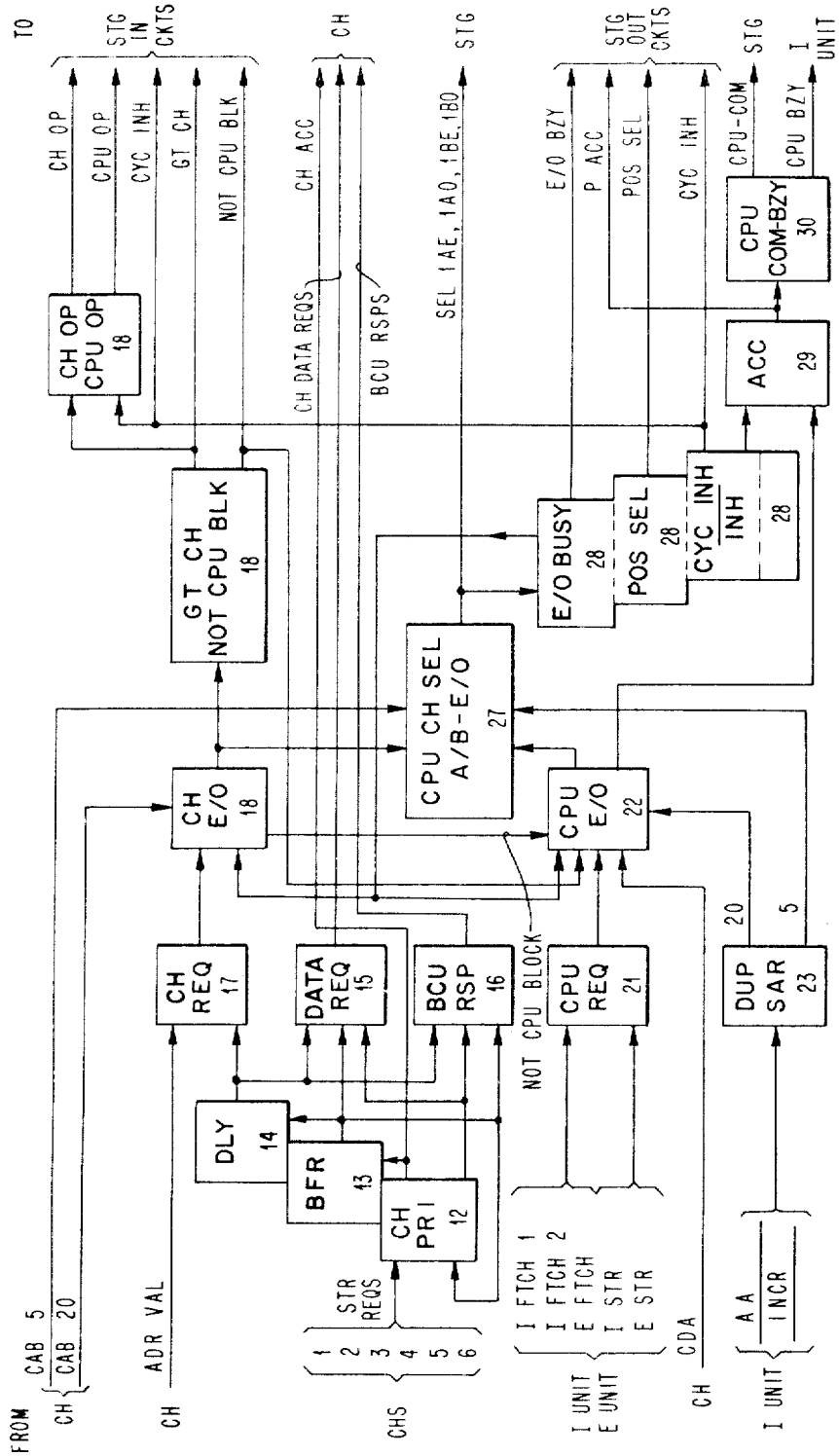

An illustrative embodiment of the present invention is shown in FIG. 9, and in greater detail in FIG. 12 through FIG. 18. The remaining figures illustrate the environment of the exemplary embodiment, and demonstrate certain of the relationships involved therewith.

(2.0) REFERENCES

A primary reference in understanding the full environment of the present invention is an architectural description, or definition, of a system in which the present invention is embodied. This comprises a manual entitled "IBM System/360 Principles of Operation," a copy of which is available in the Scientific Library of the U.S. Patent Office "IBM Form No. A–22–6821."

Another reference, which discloses a small system in accordance with the architecture of said System/360 Manual is found in a copending application of the same assignee entitled Data Processing System, Ser. No. 357,372, filed on Apr. 6, 1964, by G. M. Amdahl, et al.

An input/output channel device which is adapted for use in said environmental system is disclosed in a copending application of the same assignee entitled Automatic Channel Apparatus, Ser. No. 357,369, filed Apr. 6, 1964, by L. E. King, et al.

A bipolar latch, used throughout said environmental system, is described in detail in an article by O. J. Bedrij, entitled, Gated Trigger With Bipolar Set, IBM Technical Disclosure Bulletin, vol. 2, No. 6, April 1960, page 50.

A binary trigger is referred to in particular in section 5. This trigger is described in detail in section 11b of a copending application of the same assignee entitled Parallel Memory, Multiple Processing, Variable Word Length Computer, Ser. No. 332,648, filed Dec. 23, 1963, now Patent No. 3,270,325, by R. S. Carter and W. W. Welz.

Binary-decimal addition is described in a copending application of the same assignee, Ser. No. 223,431, entitled Byte Processing Unit, filed Sept. 13, 1962 by Robert Keslin. A shifter is described in a copending application of the same assignee, Ser. No. 162,477, Proportional Space Matrix Printer, filed Dec. 27, 1961, now Patent No. 3,174,427 by Richard L. Taylor.

Additional references include the following copending applications of the same assignee as in this case, each of which forms a part of, and is illustrated in, the environmental system, which is entitled Large Scale Data Processing System.

Large Scale Data Processing System, Ser. No. 445,326, filed Apr. 5, 1965, by O. L. MacSorley et al., now abandoned.

Large Scale Data Processing System, Ser. No. 609,238, filed on Jan. 13, 1967, by O. L. MacSorley et al. said application being a continuation-in-part of Serial No. 445,326.

Storage Reference Priority in a Data Processing System, Ser. No. 445,316, filed Apr. 5, 1965, now abandoned, by L. J. Hasbrouck et al.

Storage Reference Priority in a Data Processing System, Ser. No. 609,239, filed on Jan. 13, 1967, by L. J. Hasbrouck et al., said application being a continuation-in-part of Serial No. 445,316.

Unit Unavailability Detector for a Data Processing System, Ser. No. 445,318, filed Apr. 5, 1965, now Patent No. 3,341,824, by W. P. Wissick et al.

Storage Cancellation and Panel Data Key Fetching in a Data Processing System, Ser. No. 445,311, filed Apr. 5, 1965, now abandoned, by W. P. Wissick et al.

Storage Cancellation and Panel Data Key Fetching in a Data Processing System, Ser. No. 609,252, filed on Jan. 13, 1967, by W. P. Wissick et al., said application being a continuation-in-part of Ser. No. 445,311.

(3.0) NOMENCLATURE

The nomenclature of the present embodiment is almost entirely consistent with that shown in said System/360 Manual. A few exceptions do exist however. One of these is the instruction Execute and is herein referred to in abbreviated form as XEQ, whereas said Manual refers to this instruction in abbreviated form as EX. Another example is the instruction Edit; it is referred to in abbreviated form herein as EDT whereas said Manual refers to same as ED. In order to avoid confusion with "execution," "E decode," and other similar functions in the present embodiment, these changes have been made. However, a good definition of each of the instructions which may be performed by the present embodiment is found in said Manual. Additionally, the functions of a data processing system in accordance with the architectural definition within said Manual are applicable to this embodiment, with the exception of the fact that the present embodiment does not provide for: sharing of storage by more than one system, a multiplex channel, direct coupling between computers, large capacity storage, and certain other features which could be available on an embodiment of the system described in said Manual. However, said environmental system is readily adapted for the achievement of these functions.

In the present embodiment, a bit means a binary unit of intelligence, which can be either a one or a zero. A byte comprises eight bits, two bytes comprise a syllable or a half-word. Two syllables, or two half-words comprise a word, which includes thirty-two bits. A storage word is two words or sixty-four bits in the environmental system of the present embodiment. In storage, and within the data flow of the environmental system, there is one parity bit for each eight bits of data; at certain points in a data flow this is altered; for instance, at the output of an adder, it is possible that parity may be carried to several stages of logic on a four bit basis, and then combined on an eight bit basis.

In the detailed descriptions herein, the signals which propagate between various figures are all identified by unique lines which are referred to in the upper case (such as SAR meaning the output of the storage address register, CPU RST being the line that causes a computer reset of a particular type). As is discussed more fully in section 5, hereinafter, the use of positive and negative signals as inputs to positive and negative-type circuits is so customary, that it no longer has any significance to consider signals in actual circuitry as being either the true or the complement of an event; for instance, if a signal is generated in a positive sense when the event occurs, a minus signal may nonetheless be required to indicate that event due to the fact that the circuit which is utilizing the signal requires a negative input. For that reason, complementary functions (such as NOT LC, meaning the complement of the LC signal) are referred to as inputs even though they may not be explicitly generated in the circuit where the event is manifested by the true signal.

In block diagrams which comprise a plurality of blocks, each block being represented by one or more figures, the figure or figures within which the details of the particular block are shown may be identified in that block by figure number only, without the word "FIG." actually being printed within that block. This allows a simpler block configuration which is easier to read.

In the description of the detail figures, the various circuit elements are referred to by reference numerals, the reference numerals being applicable only in the particular figure number. However, in any case where a particular item is referred to in more than one place, it would have the same reference numeral wherever it is referred to. On the other hand, reference numerals between 1 and 30 are used repetitively throughout the environmental system due to the fact that the size of the environmental system would require reference numerals having four or five digits if completely sequential reference numerals were used for the entire environmental system. Therefore, any possible tendency toward confusion is alleviated by also specifying the figure number along with the reference numeral; additionally, the description itself is patently clear insofar as the precise element to which reference is being made.

When terms such as "storage cycle" or "last E cycle" are used, machine cycles as such are not necessarily involved. For instance, a storage cycle requires five machine cycles in the embodiment of said environmental system; last cycle triggers may be set from the start of NOT L time to the start of the following NOT L time, a period equal to a 200 nanosecond machine cycle, but displaced therefrom by approximately 65 nanoseconds since the basic machine cycle is defined to be from the start of A time to the end of A time, as is described in section 7. The duration or phase of any specially-referred to cycle often differs from a basic machine cycle. The terms, when used, refer to the latched condition or event being described, as is apparent in the context where used.

In order to facilitate cross referencing between the various copending applications, and more particularly, to facilitate cross referencing of embodiments in said copending applications of portions of said environmental system with the embodiment of a full environmental system, constant sequential figure numbers are used in all of said copending applications, whereby all figure numbers are identical in all of the cases. In order to reduce the cost of printing, figure numbers which relate to circuits not required in smaller embodiments are shown in an illustrative manner only. Any reference to a figure which is shown in an exemplary form in one of said copending applications should be interpreted as a reference to that same figure in the embodiment of said environmental system.

In certain instances, control lines comprising a particular combination of operational decoding or other status indications may not be shown in detail; that is, a line called "BR OR STATUS SWX" may be utilized, as an input to a circuit, but may not be generated, as an output from a circuit. However, there are innumerable examples of generated decode lines such that the generation of any other one would be well within the skill of the art. As an example, a line called "VFL T1 or Y $\neq$ 0" could be generated by the OR of "VFL T1 or Y $Y \neq 0$," or with "NOT Y EQ 0," or by ORing the bits of the Y REG to see that Y does indeed equal other than zero.

(4.0) BRIEF DESCRIPTION OF ENVIRONMENTAL SYSTEM (FIG. 2)

Figure 2:
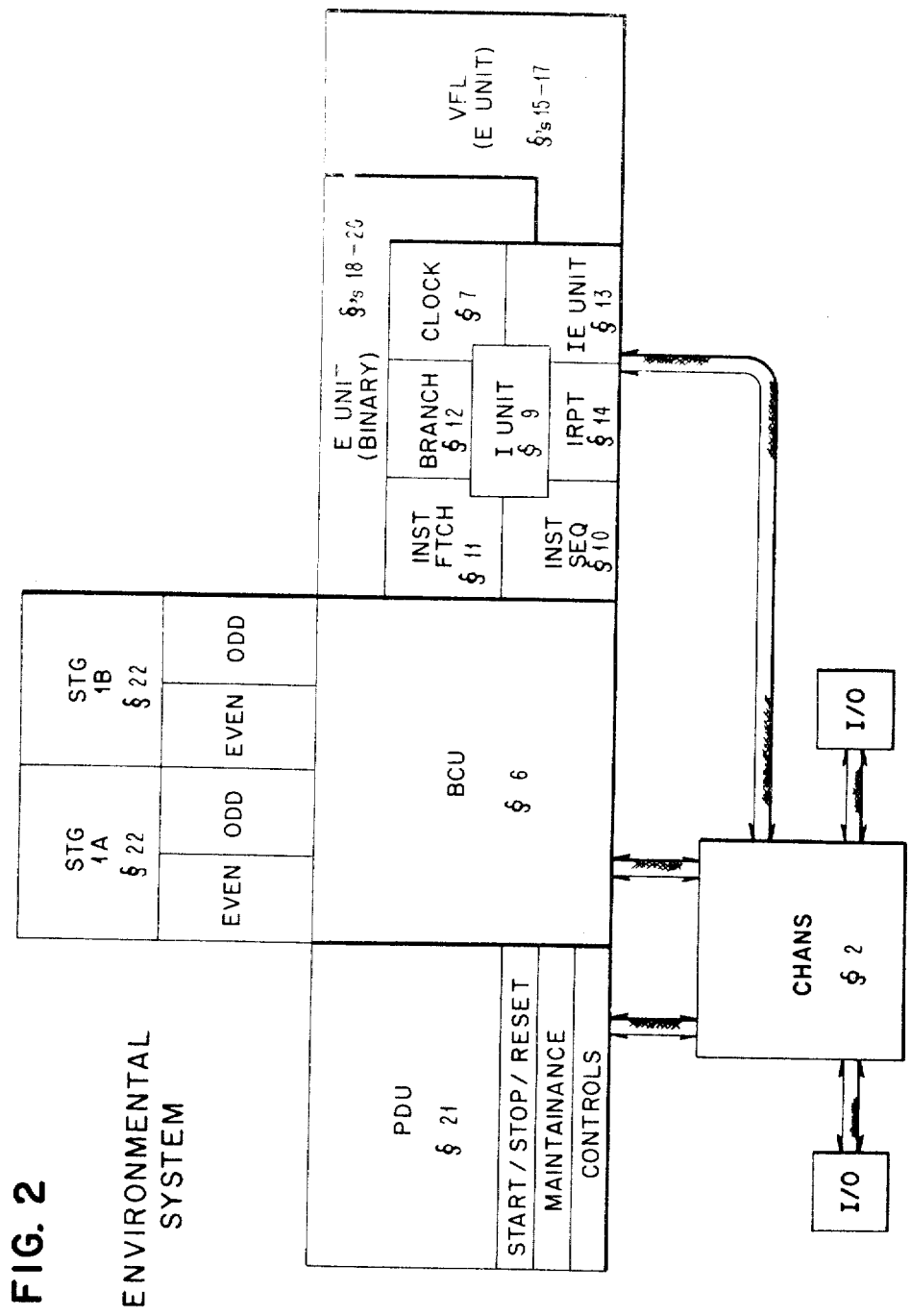

In FIG. 2, a block representation of said environmental system is shown to include a bus control unit (BCU) which is described in section 6, and which provides data flow communication between the various units of the system, and provides controls for the storage devices. The operator controls, certain maintenance controls, and basic stop start and reset controls are provided in the power distribution unit (PDU) described in section 21. The system also includes an I unit, the data flow portion of which is described in section 9, the main other functions of the unit being described in separate sections. The clock is shown in section 7, and includes the main timing pulses which are utilized throughout the system so as to synchronize operations. In section 10, instruction sequencing is described, and instruction fetching is described in section 11. Branching operations, and their effect on the remainder of the system are all described in section 12. Communication with channels, and performance of certain supervisory type instructions, inter alia, are described with respect to an I execution unit (IE UNIT) in section 13. Interruption handling, and functions which, although not interruptions, are handled by the interruption circuitry, are described in section 14 of said environmental system. The E unit of said environmental system includes a binary portion and a VFL portion, which are referred to in a compound fashion; both the binary and VFL portion are considered part of the E unit, and E unit controls can come from either portion. However, the binary portion is generally not referred to as such, but is referred to merely as the E unit, and the VFL (variable field length) portion is usually referred to as the "VFL." Storage devices are not completely described herein, but the logical control thereover as it relates to the bus control unit is described in section 22.

(5.0) COMPONENT CIRCUITS (FIG. 3 THROUGH FIG. 8)

In FIG. 3 through FIG. 8, component circuits of the type which may be utilized in said environmental system are illustrated. These are not exhaustive, and merely illustrate types of circuits which might be utilized, and the manner in which they are illustrated in the detailed description of said environmental system.

Figure 3A:
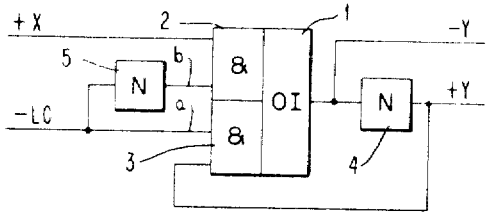

In FIG. 3a, a simple latch is shown. This comprises an "AND-OR-INVERTER" combination which includes an OR-INVERT circuit 1 and two AND circuits 2, 3 as well at two inverters 4, 5. In normal operation, whenever the LC line is positive, the inverter 5 will provide a signal "b" to the AND circuit 2 so that a +X signal, whenever it may arrive, will cause the AND circuit 2 to activate the OR-INVERT circuit 1 thereby generating a —Y signal. If the +X signal is removed, then the —Y signal will disappear. The —Y signal causes the inverter 4 to generate the +Y signal which is fed back to an AND circuit 3; however, so long as the —LC pulse is present, the AND circuit 3 will not operate, so that the circuit of FIG. 3a is essentially an AND circuit whereby a +X signal and the signal from the inverter 5 pass through the AND circuit 2, becomes inverted in the OR circuit 1, and no latching takes place.

When the LC signal turns positive (at NOT L time) then any +X signal will cause a +Y signal to be gated through the AND circuit 3 thereby causing the circuit of FIG. 3a to become latched for the duration of the +LC signal. When the LC signal returns to a negative condition (at L time) then the state of the latch can again be changed. During the time that the circuit is latched, the AND circuit 3 will be passing a signal through the OR circuit 1 provided the latch was on at the time that the latching condition commenced, and the AND circuit 2 is blocked by the inverter 5. When the LC line returns to a negative condition, the AND circuit 3 will be immediately blocked, and the inverter 5, having about a seven nanosecond delay, will later cause the unblocking of the AND circuit 2. Thus, there is a short period of about seven nanoseconds (as illustrated in FIG. 3d) when the circuit of FIG. 3a will have no output whatever. This is of too short a duration to be illustrated in FIG. 3c which shows the operation of the latch of FIG. 3a in general terms.

Figure 3B:
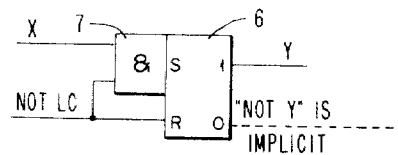
Figure 3C:
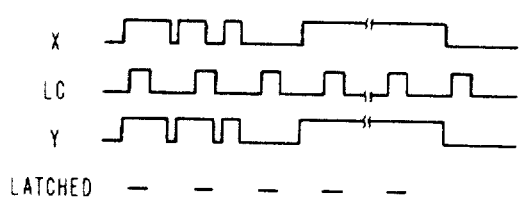
Figure 3D:
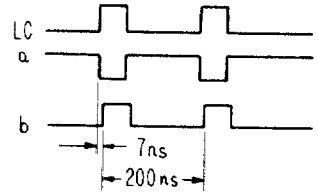

The circuit of FIG. 3a is illustrated herein as shown in FIG. 3b. Thus, the circuit of FIG. 3a can be considered to be a latch circuit 6 settable by an AND circuit 7 at NOT L time, to be reset at L time.

Figure 4A:
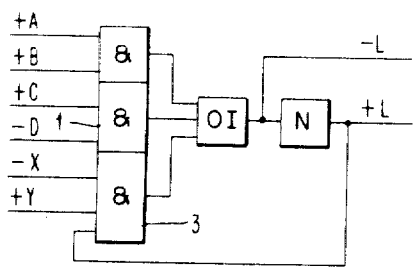
Figure 4B:
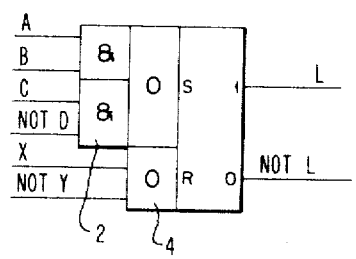
Figure 5A:
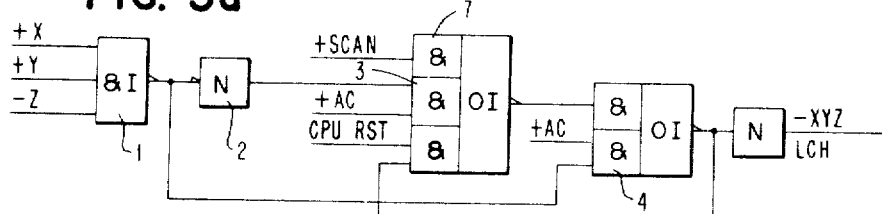

In FIG. 4a is shown a variation of a latch having a combined reset condition which, as shown in FIG. 4b includes X or NOT Y. Notice that the AND circuit 1 in FIG. 4a has a minus D signal applied thereto which represents a NOT D as illustrated by the AND circuit 2 in FIG. 4b. Also notice that the AND circuit 3 in FIG. 4a has both —X and applied Y signals thereto so that the latched effect will be ended by the disappearance of —X or by the disappearance of +Y. This is illustrated as resetting in response to either X or NOT Y by the OR circuit 4 in FIG. 4b. A still further complicated latch is illustrated in FIG. 5a. This includes an AND-INVERT circuit 1 which passes a signal through an inverter 2 (the output of which then would be positive when the conditions to the AND invert circuit 1 are met) so as to cause an AND circuit 3 to operate when the +AC signal appears. +AC means a positive controlled clock signal having the A time duration. The "C" within "AC" stands for "controlled," in contrast with "running," as is the case when an AR signal is involved. The AR signal would be of the same duration and timing as the AC signal, but could run even through single cycle operations, whereas the AC signal would be stopped during single cycle operations.

Figure 5B:
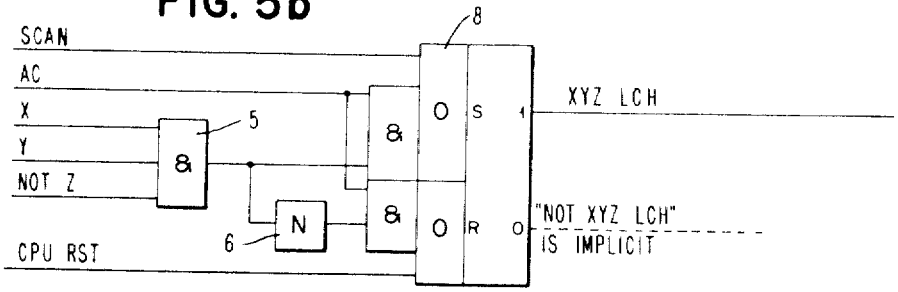

The latch of FIG. 5a can be reset by the CPU RST signal, or by the raw output of the AND INVERT circuit 1 as applied to an AND circuit 4. The circuit of FIG. 5a would be illustrated herein as shown in FIG. 5b, wherein an AND circuit 5 will either set or reset the latch in dependence upon whether the conditions are met, due to the assistance of an inverter 6. Notice also that single-input AND circuits such as the AND circuit 7 in FIG. 5a actually represent merely an input to the OR INVERT circuit, as illustrated by the direct application of the scan signal to the OR circuit 8 in FIG. 5b.

Figure 6A:
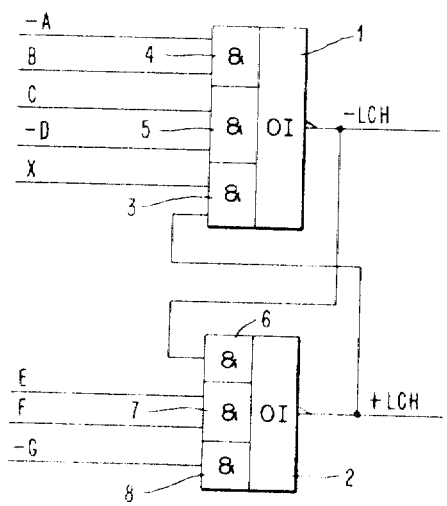
Figure 6B:
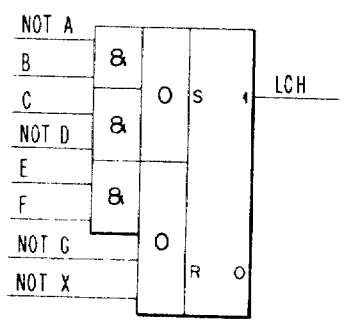

A variation in the circuit of FIG. 5a is shown in FIG. 6a, wherein a first OR INVERT circuit 1 operates when the latch is in the on condition, and a second OR INVERT circuit 2 operates when the latch is in the reset condition. When the OR circuit 2 operates, it has a negative output, thereby locking an AND circuit 3. However, a negative output from the OR circuit 2 does not preclude an output from the latch inasmuch as either one of two AND circuits 4, 5 could supply an input to the OR circuit 1. If either of the AND circuits 4, 5 do operate, then there will be a minus signal out of the OR circuit 1 which will block a single-input AND circuit 6 at the input to the OR circuit 2 so that the OR circuit 2 will normally have no output unless inputs are applied to either an AND circuit 7 or a single input AND circuit 8. With the OR circuit 2 locked, its positive output will be applied to an AND circuit 3, and if there is an X signal at the AND circuit 3, then the latch will remain on even though either of the OR circuits 4, 5 which turn the latch on in the first place no longer has inputs thereto. This is illustrated more clearly in the circuit shown in FIG. 6b, which represents the manner of illustrating this circuit herein. As seen in FIG. 6b, the latch can be turned on by NOT A and B, or by C and NOT D. If turned on, it will latch up provided that E and F are not both present, and provided that G and X are both present. If the latch turns on and becomes latched in an on condition, then the appearance of E and F together or the appearance of NOT G or NOT X will cause the latch to turn off.

Figure 7A:
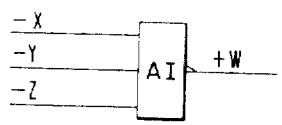
Figure 7B:
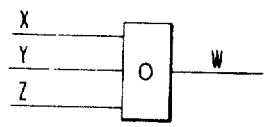

In FIG. 7a, an AND INVERT circuit with minus inputs is shown to create a +W signal. This is fully equivalent to the circuit of FIG. 7b wherein a positive, non-inverting OR circuit responds to positive XYZ signals to generate a positive W signal.

Figure 8A:
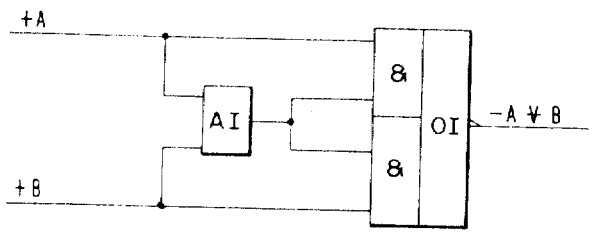
Figure 8B:
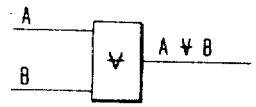

FIG. 8a is a simple illustration of a two input EXCLUSIVE OR circuit, which is represented herein as shown in FIG. 8b. It should be understood that the EXCLUSIVE OR function with only two inputs is a test for oddness: that is, one and only one input must be present; if no inputs or two inputs are present, then there will be no output. Thus, an odd number of inputs are required. In the embodiment described herein, a term "EXCLUSIVE OR circuit" is utilized to mean a complex of EXCLUSIVE OR circuits which test for oddness and evenness of the inputs thereto. These may be actually manifested in two input EXCLUSIVE OR circuits as shown in FIG. 8a, or may be represented with EXCLUSIVE OR circuits actually responding to more inputs. To the extent that more than two inputs are shown, it can be assumed that a three input EXCLUSIVE OR circuit or a two input EXCLUSIVE OR circuit or combinations thereof are utilized in a well-known "tree" fashion so as to provide an EXCLUSIVE OR complex which gives an output whenever the inputs thereto are odd in number.

From the foregoing description, it can be seen that the presence of a plus or a minus signal has no significance in and of itself, due to the way in which a plus or a minus signal may be utilized. For instance, when applied to a +AND circuit of a reset side of a latch as shown in FIG. 6a, it may be a NOT signal, as illustrated by the NOT G signal shown in FIG. 6b. Similarly, when applied to a resetting AND circuit such as the AND circuit 3 in FIG. 4a, a —X signal really becomes an X signal in terms of its logical connotation as illustrated in FIG. 4b. Also, the minus signals applied to the circuit of FIG. 7a in fact are plus signals when the function of that circuit is considered to be an OR circuit. For that reason, the simplified showing of the present embodiment (such as illustrated in FIGS. 3b, 4b, 5b, 6b, 7b and 8b) do not consider whether a plus or minus signal may be generated at the source of a single, or whether that signal may be generated in true or complement form, since such considerations have no bearing on the way in which the signal may be utilized. However, at the input to any particular circuit (such as the input to FIG. 6b) the affirmative or negative function which the signal represents does have logical connotation and is shown. To the extent that a "NOT SIGNAL" is required but not generated, it is implied that one with ordinary skill in the art could obtain the opposite phase thereof from the source of the "SIGNAL." This is illustrated, for instance, in FIGS. 3a and 3b where both phases are generated in 3a, and only the affirmative phase is generated in 3b, the complement thereto being implied.

(6.0) BASIC BUS CONTROL UNIT

The BCU (bus control unit) acts as a buffering traffic control for data, address, control, and checking signals between the storage devices and the rest of the system. In this embodiment, the CPU (including the I unit, the IE unit, the BE unit, and the E unit) is considered to be a single device with respect to the accessing of storage, and it must share storage with the channels. Each of the I/O channels 1–6 has a priority rating corresponding to its number (1–6), and the MC (maintenance channel, including panel keys and panel indicators) comprises a seventh, lowest-priority channel for storage reference purpose. In accessing storage, priority is determined as between channels, and then priority is determined between the selected channel and the CPU. Stated alternatively, the CPU may reference storage unless it is prevented from doing so by a prior outstanding request for an available storage device initiated from one of the channels; which one of the channels will be permitted to reference storage is determined independently by a channel priority circuit. For purposes of completeness and simplicity, the embodiment of a bus control unit described in this section does not include provisions for handling a large capacity storage, nor for the sharing of a single storage device by more than one data processing system. The BCU comprises three general portions, shown in FIG. 9, FIG. 10 and FIG. 11, and described in Sections 6.1, 6.2, and 6.3, respectively (sections 6.2 and 6.3 appear in previously referred to application Ser. No. 609,238).

(6.1) SELECTION CIRCUITS

FIG. 9 is a simplified functional block diagram of the selection circuits in which all of the blocks represent figures where circuit details are shown, and the blocks are referred to by figure number rather than by an arbitrary reference numeral. For instance, in the extreme upper left hand corner of FIG. 9, a CH PRI (channel priority) circuit is shown in detail in FIG. 12 (described hereinafter), and the circuit is referred to in the description of FIG. 9 as the "channel priority circuit, FIG. 12." Although not all interconnecting lines are shown in FIG. 9, the main control, data and address lines of the selection circuits are all shown.

(6.1.1) Channel priority (FIG. 9)

Figure 12:
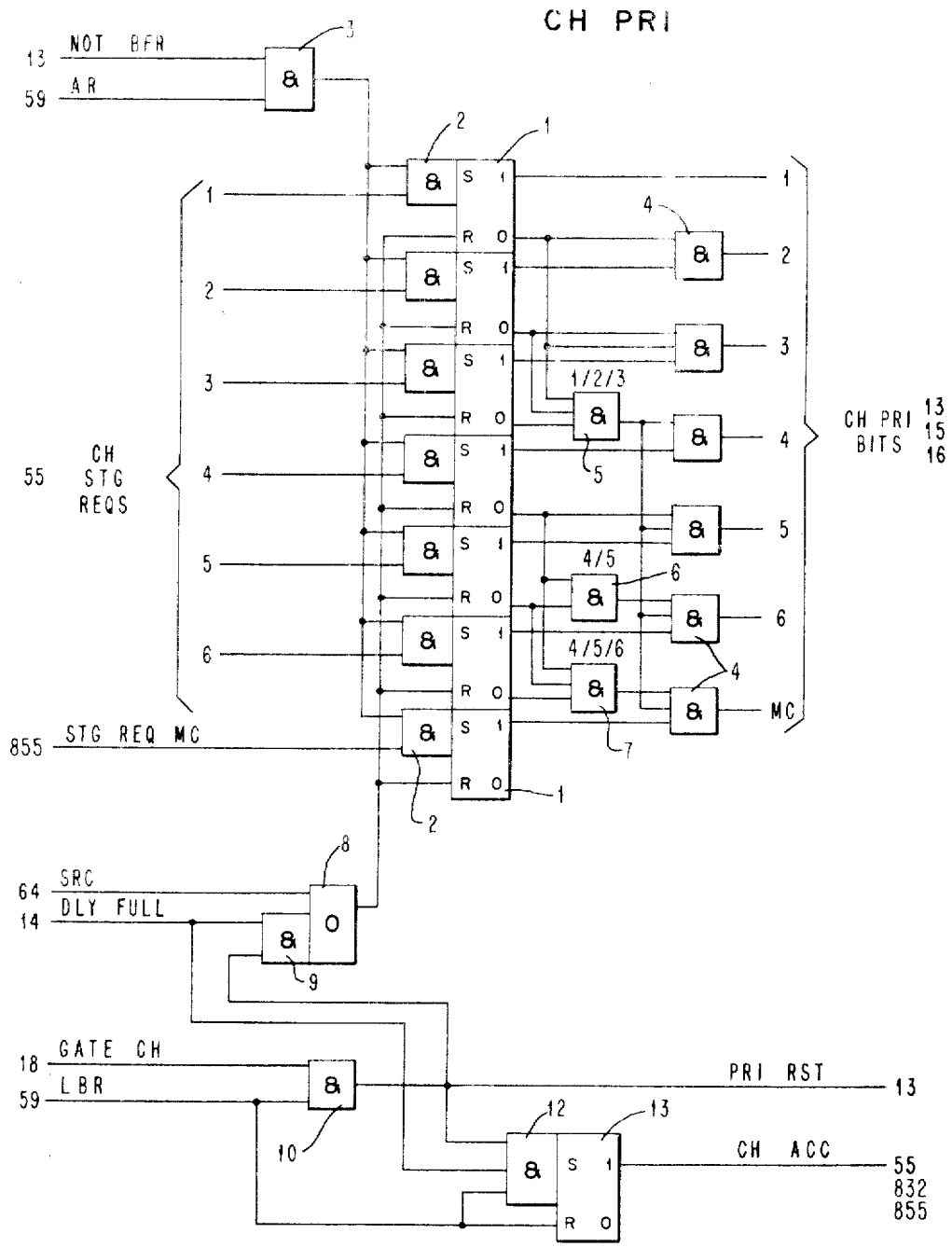
Figure 13:
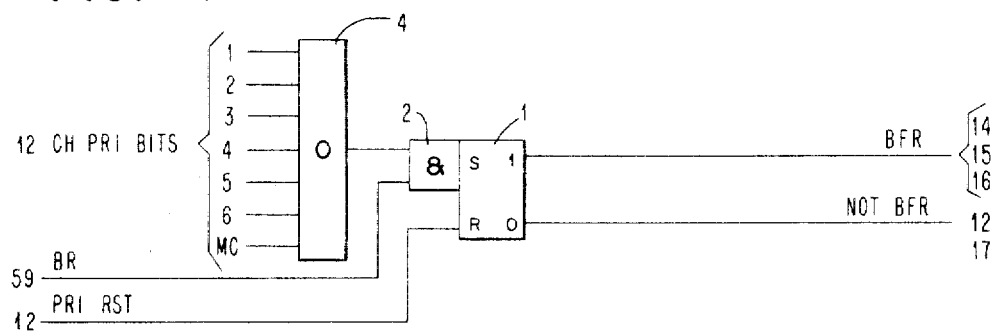
Figure 14:
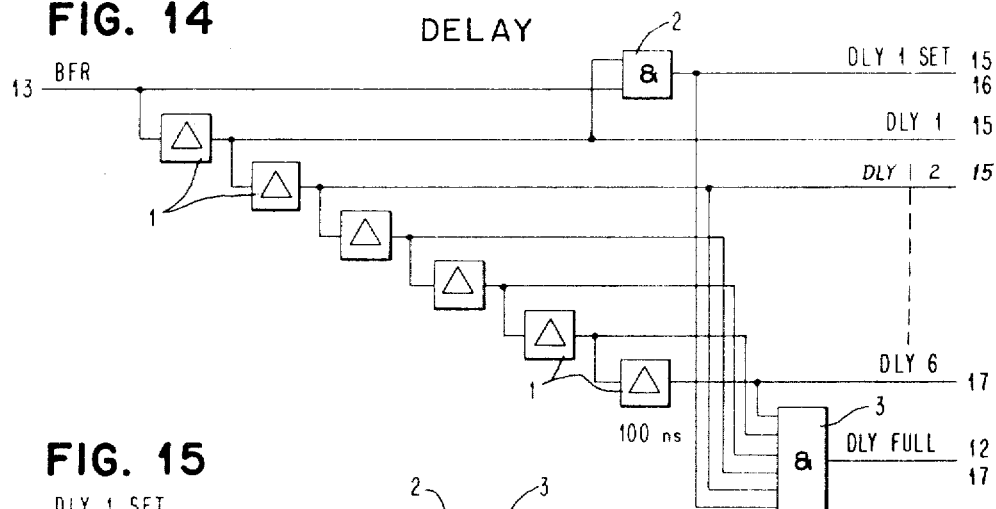
Figure 15:
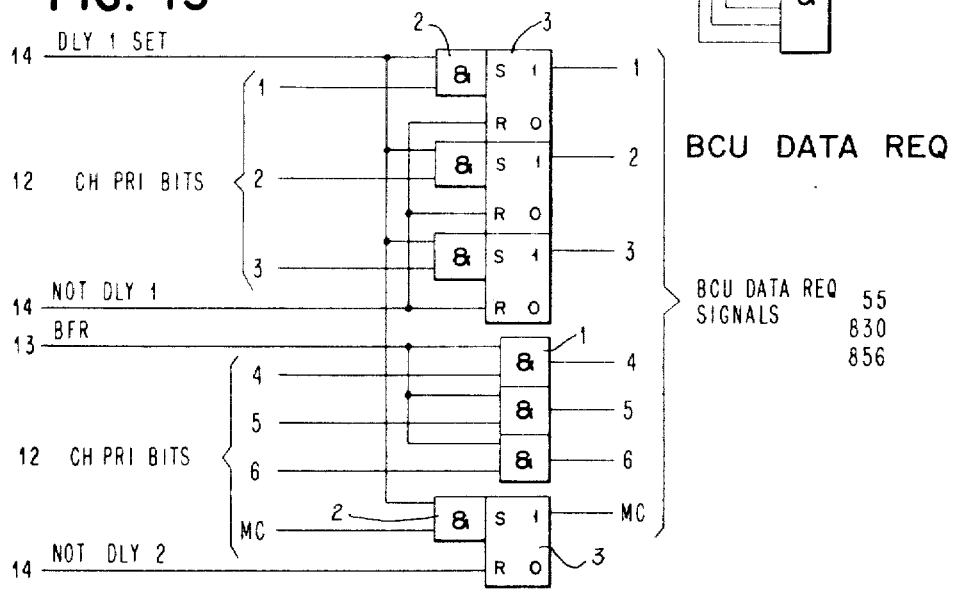
Figure 16:
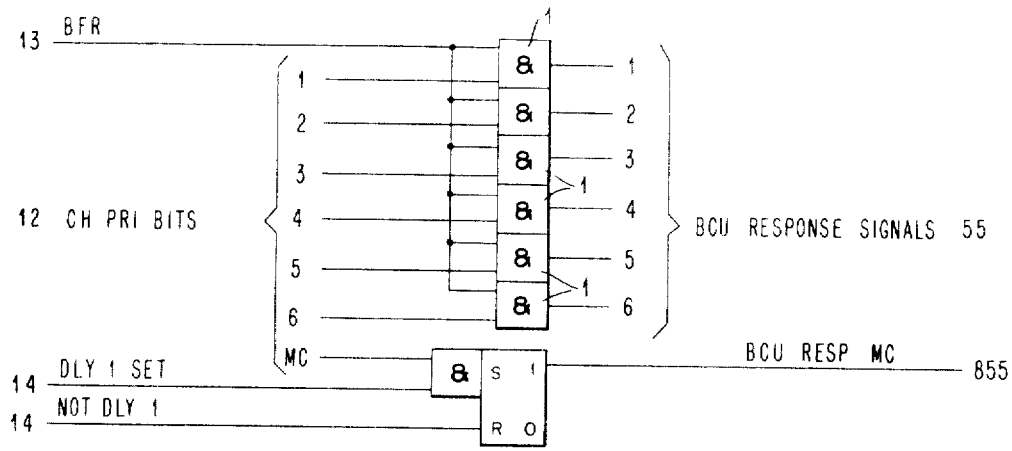

In the upper life-hand corner of FIG. 9 are shown the circuits which determine priority as between channels, including the channel priority circuit, FIG. 12, the buffer circuit FIG. 13, the delay circuit, FIG. 14, the BCU data request circuit, FIG. 15, and the BCU response circuit, FIG. 16.

The channel priority circuit, FIG. 12 (CH PRI), assigns priority to the channels, channel 1 being first, channel 6 being next to last, and the maintenance channel having lowest priority. All the circuit does, is lock out any channel of lower priority once it has selected a channel of a given priority; selection of the particular channel is complete when a buffer circuit (BFR) FIG. 13 (which is a trigger), turns on, in response to there being a request for storage reference from a channel; in turning on, the buffer blocks further channel storage requests. Once the buffer is turned on, it will start a delay circuit (DLY), FIG. 14, which provides signals at different times to control the timing of the channel priority circuits. The output of the channel priority circuit, FIG. 12, the buffer circuit, FIG. 13, and the delay circuit, FIG. 14, are each fed to a BCU data request circuit (DATA REQ), FIG. 15, and a BCU response circuit (BCU RSP), FIG. 16. Each of these circuits sends a corresponding signal back to the respective channel (the selected channel) to request data and one address from the channel; a signal on the CH ACC (channel accept) line indicating to the channel that the storage request from that channel has been honored. The data request signal and BCU response signal are identical except for timing.

In the BCU, it is desirable to reset the priority circuits as soon as possible so that the priority circuits will be available to do the initial contact work with a channel making a subsequent request currently being handled. However, it cannot be reset so soon as to preclude receiving address and data information from the channel which has just made a request. Therefore, a time is picked which is sufficiently early enough to permit the next channel to make a request as soon as possible, but which will cause the communication of the resetting of the priority circuit back to the channel to be sufficiently late so that, by the time the channel received this communication, its data and address information will have been accepted at the BCU and be participating in an actual storage access. The timing of this is controlled when the BCU RSP and BCU DATA REQ are sent to the channel, the timing of the reset itself being fixed with respect to the turning on of the buffer. Inasmuch as the response to each of these channels can be controlled with sufficient precision by utilizing the various outputs of the delay circuit (FIG. 14), the resetting of the priority circuit can be done in a fixed fashion without regard to the particular channel which has been accepted for a storage reference. This simplifies the priority resetting circuit.

The significance of the interrelation of the selection circuits, and features of importance with respect to various component circuits thereof are discussed in detail in Section 6.1.6, which follows the detailed introduction to each of the circuits.

(6.1.1.1) Channel priority circuit (FIG. 12)

The channel priority circuit, FIG. 12, comprises essentially a plurality of latches 1, each settable by a corresponding AND circuit 2 in response to a setting signal from an AND circuit 3 which is operated by a signal on the NOT BFR line from FIG. 13 (indicating the buffer trigger is not SET), and by a running A clock (AR) from the I unit. A channel storage request can therefore be set into one of the latches 1 at A time following the presence of a signal on a corresponding channel storage request line provided the buffer has not yet been set. It is the setting of the buffer therefore that controls the admissibility of requests, and that therefore establishes the point in time when priority has been established. The output of the latches comprise tentative channel priority bits, channel 1 being automatically recognized (if its latch is SET) as the channel for which priority has been granted, due to the fact that there is no AND circuit in the output of the latch. However, each of the latches corresponding to the channels 2 through MC has an AND circuit 4 which is blocked by the setting of any latch corresponding to a channel of higher priority. For instance, the output of the latch corresponding to channel 4 will be blocked by the related AND circuit 4 unless an AND circuit 5 provides a gating signal in response to the out-of-phase outputs (0) of the latches corresponding to channels 1, 2 and 3; in other words, in the event that any of the channels 1, 2 or 3 has set its latch, then the output of the latch for channel 4 will be blocked by a lack of a signal from the AND circuit 5. Similarly, another AND circuit 6 together with the output from the AND circuit 5 controls the gating of the output of the latch corresponding to channel 6.

Figure 18:
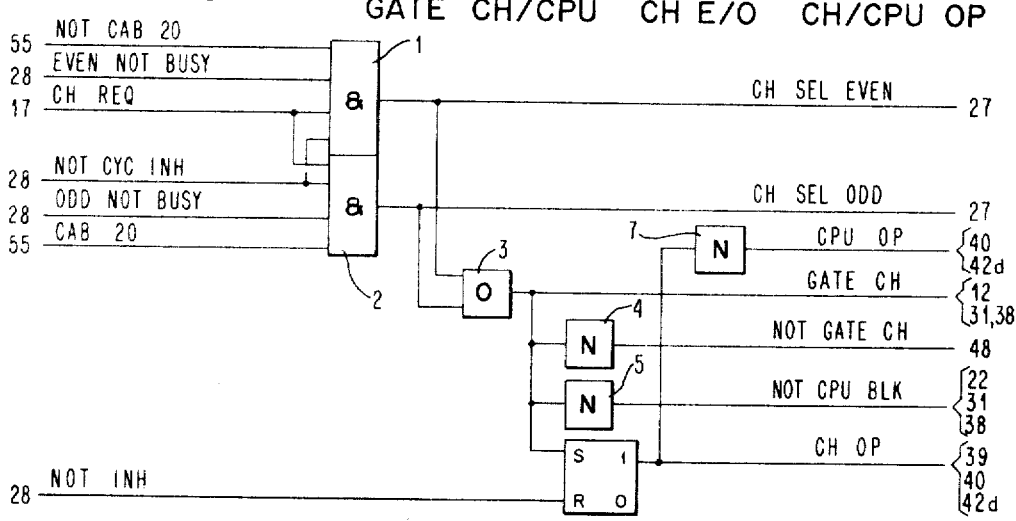

Each of the latches 1 is reset by an OR circuit 8 which will operate in response to the system reset control (SRC) from the CPU or in response to an AND circuit 9 which, due to a further AND circuit 10, will operate in response to a signal on the DLY FULL line from FIG. 14 during a late B running clock signal (LBR line) whenever a channel will in fact access storage (during the following cycle) as indicated by a GATE CH gate channel signal on the line from FIG. 18. The output of the AND circuit 10 comprises a priority reset which is also used to reset the BFR circuit of FIG. 13.

The signal on the PRI RST line is also used along with the signal on the DLY FULL line and a late B clock pulse on the LBR line to gate an AN circuit 12 which is used to set a latch 13 which generates a channel accept signal on a CH ACC line, which comprises an indication that a request for storage reference by a channel has been accepted. Notice that this is directly responsive to signal on the GATE CH line, which signal cannot appear until a channel request for even or odd storage has been matched by an available even or odd storage, and a corresponding storage cycle has been initiated. The latch 13 is reset at the start of the next B time due to the application to the reset side of the latch of the signal on the LBR line. Also, the channel accept signal is essentially identical to the reset condition of the channel storage request latches 1 (in FIG. 9) except for the fact that it is latched through one cycle.

The outputs of the AND circuits 4 comprise the respective channel priority bits which are utilized in setting the buffer (FIG. 13) and in causing the correct BCU data request or BCU response to be generated in FIG. 15 and FIG. 16, respectively.

Thus the channel priority circuit of FIG. 12 will be set at A time provided it has not previously been set so as to activate the buffer of FIG. 13, and will remain set until late B time in some cycle which follows the presence of a signal on the DLY FULL line from FIG. 14; when GATE CH will appear depends on when a correct storage unit becomes available, up to five machine cycles (1 us.) later (see Section 6.1.2.2). As can be seen from a timing diagram, FIG. 19, DLY FULL does not appear until about the middle of the fifth cycle of a sequence of cycles in which a storage request has been made for one of the channels. Thus, the latches, when set, will remain set until the BCU response and BCU data request from FIG. 15 and FIG. 16 can be sent to the selected channel; note however, that no other channel request will be honored because the buffer is on until the time when DLY FULL goes off after having reset the latches.

Note that running clocks are used in FIG. 12 since channel priority is not operated by single cycle operation under control of the maintenance panel, but rather, whenever single cycle operation should cause a channel response, the priority circuits can respond thereto in a normal fashion.

(6.1.1.2) Buffer circuit (FIG. 13)

The buffer circuit shown in FIG. 13 comprises essentially a trigger 1 which is set by an AND circuit 2 at B time provided there is an output from an OR circuit 4 in response to any one of the channel priority signals 1–MC on the CH PRI BITS lines from the channel priority circuit, FIG. 12.

The buffer will be set within a small fraction of a cycle of the setting of any of the storage request priority latches in FIG. 12. With the buffer set, no further setting of the latches, FIG. 12, can take place, and due to the priority control at the output of those latches, the circuit of FIG. 12 will settle down to pick a particular channel as the channel having priority. The buffer is reset by a signal on the priority reset line from FIG. 12, as described in Section 6.1.2, hereinbefore.

The buffer guarantees sliver-free (definite) operation when a request latch is only partially set. A storage request signal appearing at the end of an A time could cause a short pulse that might condition the AND circuit 2, FIG. 12; but it might not suffice to fully latch the request latch. Gating for the buffer is developed a quarter cycle after the end of A time. During this quarter cycle interval of time, the request latch would definitely be in a stable state (off or on); therefore, a definite priority would be established.

(6.1.1.3) Delay circuit (FIG. 14)

The delay circuit of FIG. 14 comprises essentially a plurality of delay units 1, each having a delay of approximately 100 ns. which is equal to about one-half of a cycle. Each of these delay units can be of any known type, the function of each being to cause the output of the unit to follow the input of the unit after the half cycle of delay time has expired. In other words, the signal will be present on the DLY 1 line 100 nanoseconds after a signal appears on the BFR line from FIG. 13, and this signal will be present until 100 nanoseconds after the time that the signal is no longer present on the BFR line.

The delay circuit is somewhat unique in the provision of a signal on a DLY 1 SET line in response to an AND circuit 2 which is operative in response to the concurrent presence of a signal on the DLY 1 line and the BFR line. The purpose of the signal on the DLY 1 SET line is to provide a signal which goes on at the time of DLY 1 but goes off as soon as the BFR signal goes off, rather than waiting the delay period after the BFR signal goes off. The DLY 1 SET line is also applied to an AND circuit 3 to assist in generating a signal on a DLY FULL line. The AND circuit 3 is operative in response to the concurrent presence of signals on each of lines DLY 1 SET, and DLY 2 through DLY 6. The outputs of the delay circuit, FIG. 14, are used in FIG. 12, FIG. 15, FIG. 16, and FIG. 17 to control the channel priority circuits in a manner that is described in detail with respect to the various figures.

(6.1.1.4) BCU data request circuit (FIG. 15)

The BCU data request circuit shown in FIG. 15 comprises a gate circuit to cause a selected channel to send data to the BCU. A DATA REQ signal is sent even though the channel may have requested a storage fetch operation to send data to channel, since the BCU does not know at this time whether a store or fetch operation has been requested by the channel. The gating of the data request circuit is somewhat complex, to account for the different timing characteristics of the channels (which result in part from their different locations with respect to the BCU). Specifically, a data request for channel 4–6 is initiated by a corresponding AND circuit 1 as soon as there is a signal on the BFR line from FIG. 13. On the other hand, requests for channel 1–3 and the maintenance channel (MC) are not gated by corresponding AND circuits 2 until signal appears on the DLY 1 SET line, which signal requires both the BFR signal and the output of the first delay unit to be present. Additionally, data requests for channels 1–3 and the maintenance channel (MC) are lodged in corresponding latches 3 so that the signal will be available for a somewhat longer period of time; because CH 1–3 and MC are so close to BCU it is required to maintain their Data Request signals to insure a sufficient gating pulse will be generated to complete the transfer of store data from channel to the storage unit (via the SBI LTH). Dropping data request (CH 1–3 and MC) with the turn-off of the BFR would definitely not be a sufficient gating signal for those channels remember— the closer the channel—the faster the reaction between BCU and channel. A second request could in fact be initiated and cause the operation of the signal lines if these latches were not maintained set during this period where a second setting could take place, and a reset immediately thereafter. This prevents an erroneous second setting of the latches which result from the same signal being present from these close-in channels.

The MC channel is reset by the NOT DLY 2 (rather than the NOT DLY 1) because the MC channel is so very close to the BCU within the CPU section of the main frame that the double setting condition is even more critical.

The BCU DATA REQ SIGNALS (1–MC) are sent to the channel where the signals are used to initiate the sending of data on the CH SBI (channel storage bus in), which occurs only if a store operation were initiated by the channel.

(6.1.1.5) BCU response (FIG. 16)

The BCU response circuit shown in FIG. 16 comprises, essentially, a plurality of AND circuits 1 which gate corresponding channel priority bits from FIG. 12 as soon as a signal appears on the BFR line from FIG. 13. On the other hand, the BCU response signal to the MC channel is delayed, it being set 100 nanoseconds later in response to a signal on the DLY 1 SET line, from FIG. 14, and being reset 100 nanoseconds after the disappearance of the BFR signal due to the application of a signal on a NOT DLY 1 line from FIG. 14. Although not shown in FIG. 14, in accordance with the general principles upon which this description is based, it should be understood by those skilled in the art that the NOT DLY 1 line may be generated merely by inverting the DLY 1 line in any well known fashion, and, in many circuit technologies, may be available as an incident to generating DLY 1. In other words, whenever there is a signal on the DLY 1 line in FIG. 14, there will be no signal on the NOT DLY 1 line in FIG. 16, and vice versa, all as is well within the skill of the art.

Summarizing, a BCU RESPONSE SIGNAL is sent almost immediately to each of the channels 1–6, and after a 100 nanosecond delay is sent to the BCU RESP MC channel, in response to corresponding channel priority bits. The BCU response is a signal which indicates to the appropriate channel, that priority has been granted to that channel, and that it may now send address signals and other related signals to the BCU.

(6.1.2) Channel selection, generally (FIG. 9)

Figure 17:
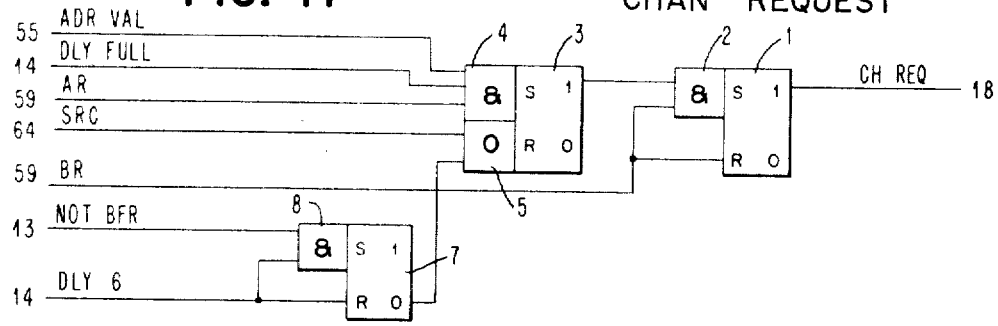

Selection of a channel for communication with a storage unit is achieved by the channel request circuit, FIG. 17, and the channel even/odd circuit FIG. 18 shown in FIG. 9. As described in preceding sections, one channel will be selected in dependence upon the priority of the channels making storage requests; from the particular selected channel, a signal will be received on an ADR VAL (address valid) line in the channel request circuit, and, providing that even or odd storage is not busy (in correspondence with the desire to select an even storage or an odd storage, respectively), a GAT CH signal is generated in response to the selecting of the even or odd storage as shown in FIG. 18 and described in detail in Section 6.1.2.2, hereinafter.

(6.1.2.1) Channel request circuit (FIG. 17)

Figure 19:
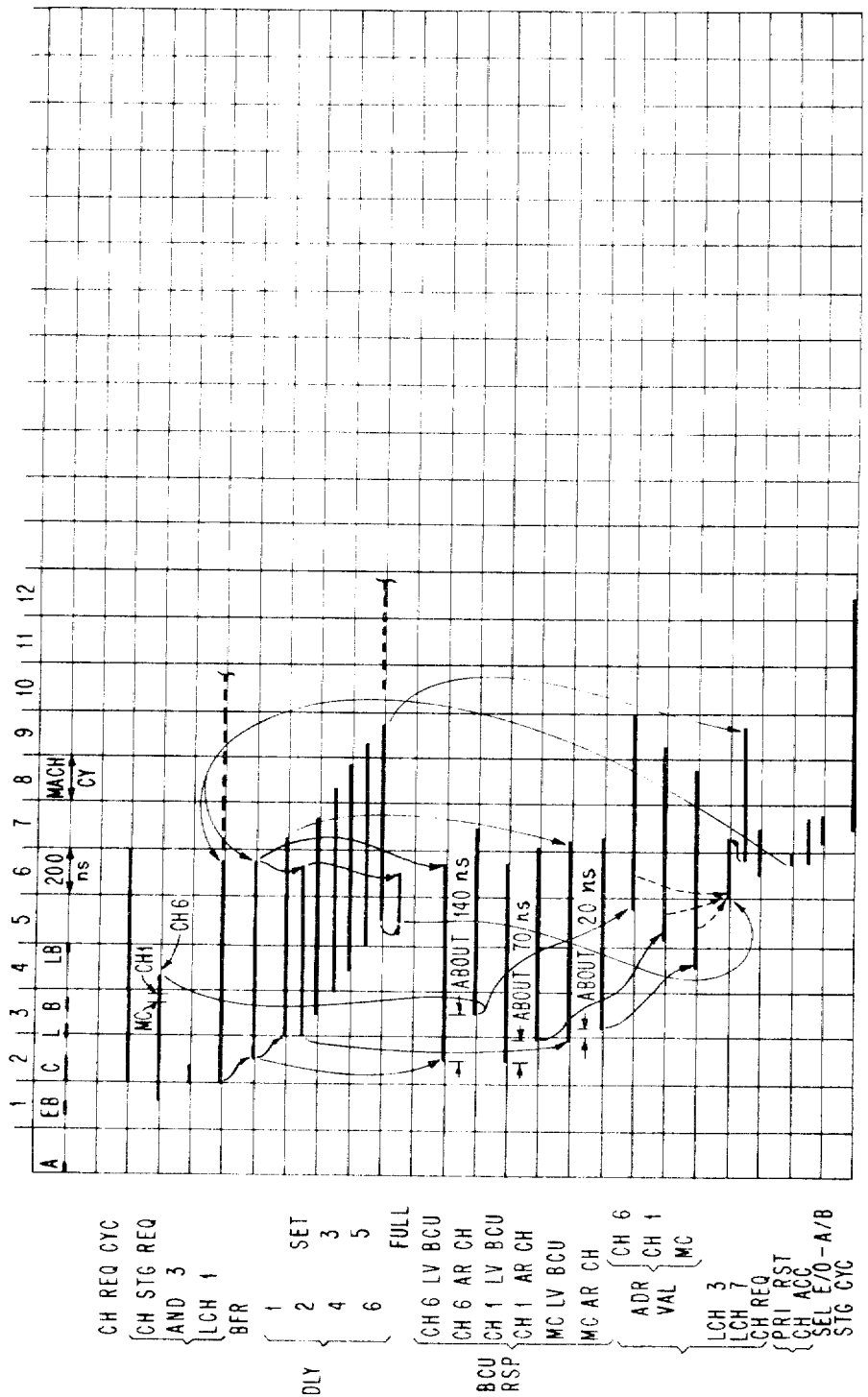
Figure 20:
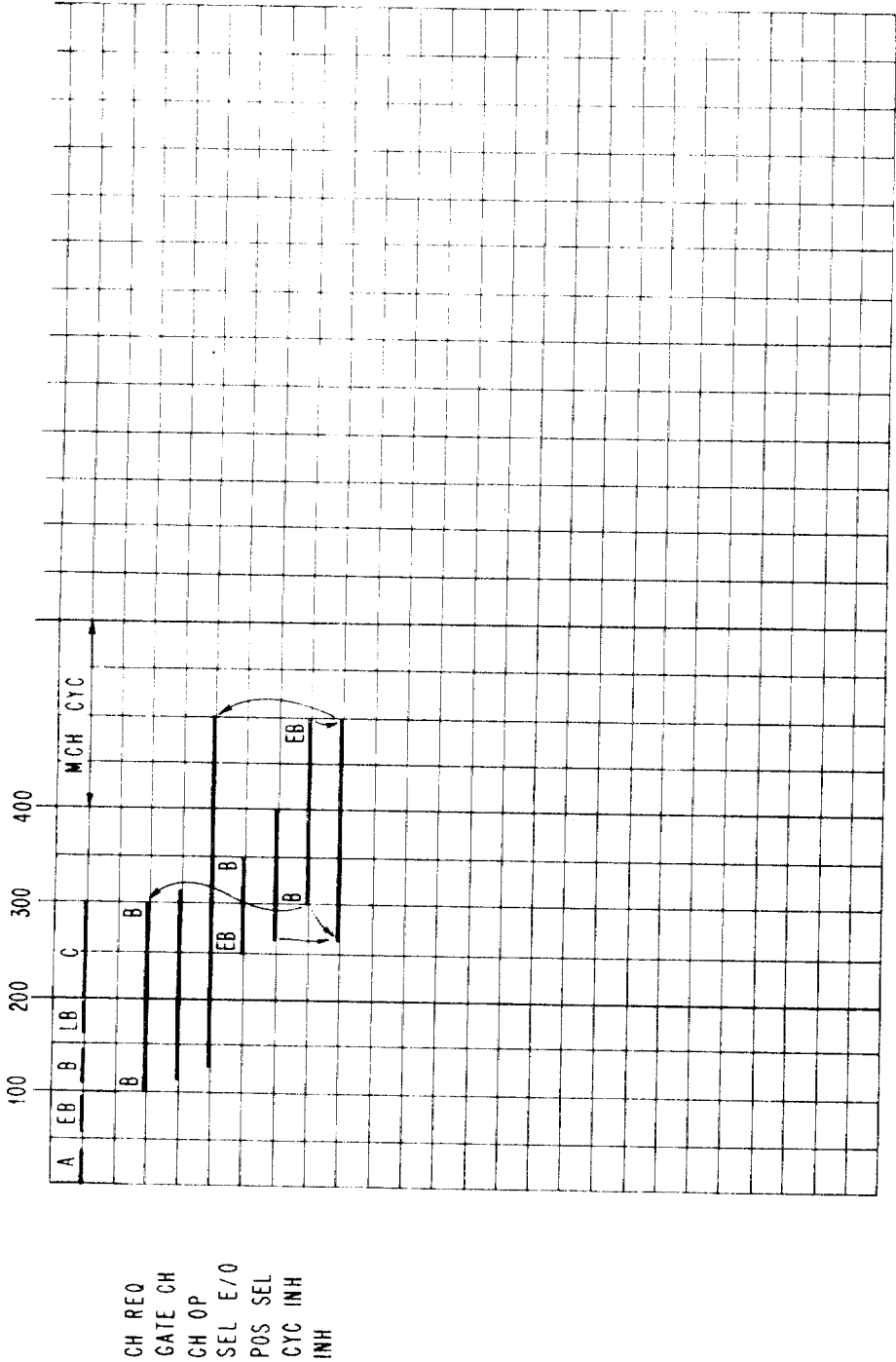

The channel request circuit shown in FIG. 17 comprises a latch 1, which when set by an AND circuit 2 will generate a signal on the CH REQ line for use in FIG. 18. The AND circuit 2 in turn responds to a latch 3 which is set by an AND circuit 4 at A time (due to a signal on the AR line), provided there is a signal on the DLY FULL line from FIG. 14 and a signal on an ADR VAL line from the channel. In the embodiment herein described, the signal will never appear on the ADR VAL line until after the DLY FULL signal has already appeared, which means that use of the ADR VAL signal as an input to the AND circuit 4 is redundant. However, if a different channel device were applied to the BCU here being described, it is possible that the delay characteristics of the channel configuration could be such that the DLY FULL signal could be available at a time earlier than when a correct address were being presented to the BCU by the channel; therefore, the ADR VAL signal being applied to the AND circuit 4 renders this BCU more universal in its compatability with channels of various designs. The use of the two latches 1, 3 permits recognizing the time when a channel request can be effective in starting a storage operation even though the ADR VAL signal may come on at differing times (in dependence upon the characteristics of the particular channel to which priority has been assigned). The latch 1 can be set only 100 ns. after latch 3 is set, which means there is no possibility of latch 3 becoming set at the wrong time within a timing signal so as to cause noise or other questionable operation of the various circuits. In other words, by the time the latch 1 can be turned on by the BR clock pulse, latch 3 must have been set nearly 50 nanoseconds earlier, and therefore has had plenty of time to fully establish the set condition (in view of the fact that only approximately 10 nanoseconds are required for a latch to establish a definite steady state). The latch 1 is not only set at B time, but also will be reset at B time. This is another latch of the type wherein the setting condition has a shorter path than the resetting condition, and a tendency to set simultaneously with a tendency to reset will cause the latch to be set. The latch is reset upon the rise of the BR signal, and is set immediately thereafter (about 4 ns.). When the BR signal disappears however, it disappears more quickly from the reset input to the latch than it does from the set input of the latch, due to the fact that an additional logic circuit is in the set path. Thus, the BR signal will be effective at the set input to the latch for a sufficient length of time *after* the loss of the BR signal at the reset input of the latch so as to leave the latch in a set condition, provided the other input to the AND circuit 2 is present. In this manner, the latch 1 is set at the start of B time and remains set until the start of the following B time. This is illustrated in FIG. 19, the channel priority and selection timing diagram.

The latch 3 is reset by an OR circuit 5 in response to the off-side of still another latch 7 which is set by an AND circuit 8 in response to the NOT BFR signal and a signal on the DLY 6 line. In operation, the latch 7 is reset when DLY 6 appears, and will be set (during DLY 6) as soon as NOT BFR appears. This conditions latch 7 to reset the latch 3 until the next NOT BFR time which causes the latch 7 to be set again. (See FIG. 19.) It is to be noted that the clock pulses are RUNNING clock pulses (AR, BR) and the reset signal utilized to reset the latch 3 is a system reset control signal (SRC) indicating that these circuits are allowed to operate by themselves during diagnostic procedures wherein CPU reset controls and single cycling may be effective.

Concerning the ADR VAL signal, it should be noted this signal is received by the BCU from the channel to indicate that the channel has sent to the BCU a valid address and other related signals. The ADR VAL signal is therefore directly caused by the BCU RSP signal sent to the channel, which causes the channel to apply a valid address on the input lines to the BCU. Thus, in the chain of operation, one considers that a storage request from a channel will eventually result in a BCU response, causing the channel to send an address and an address valid signal, which then permits the channel request circuits to recognize a particular channel storage request and initiate the storage selection process.

*(6.1.2.2) Channel even/odd selection (FIG. 18)*

Figure 10:
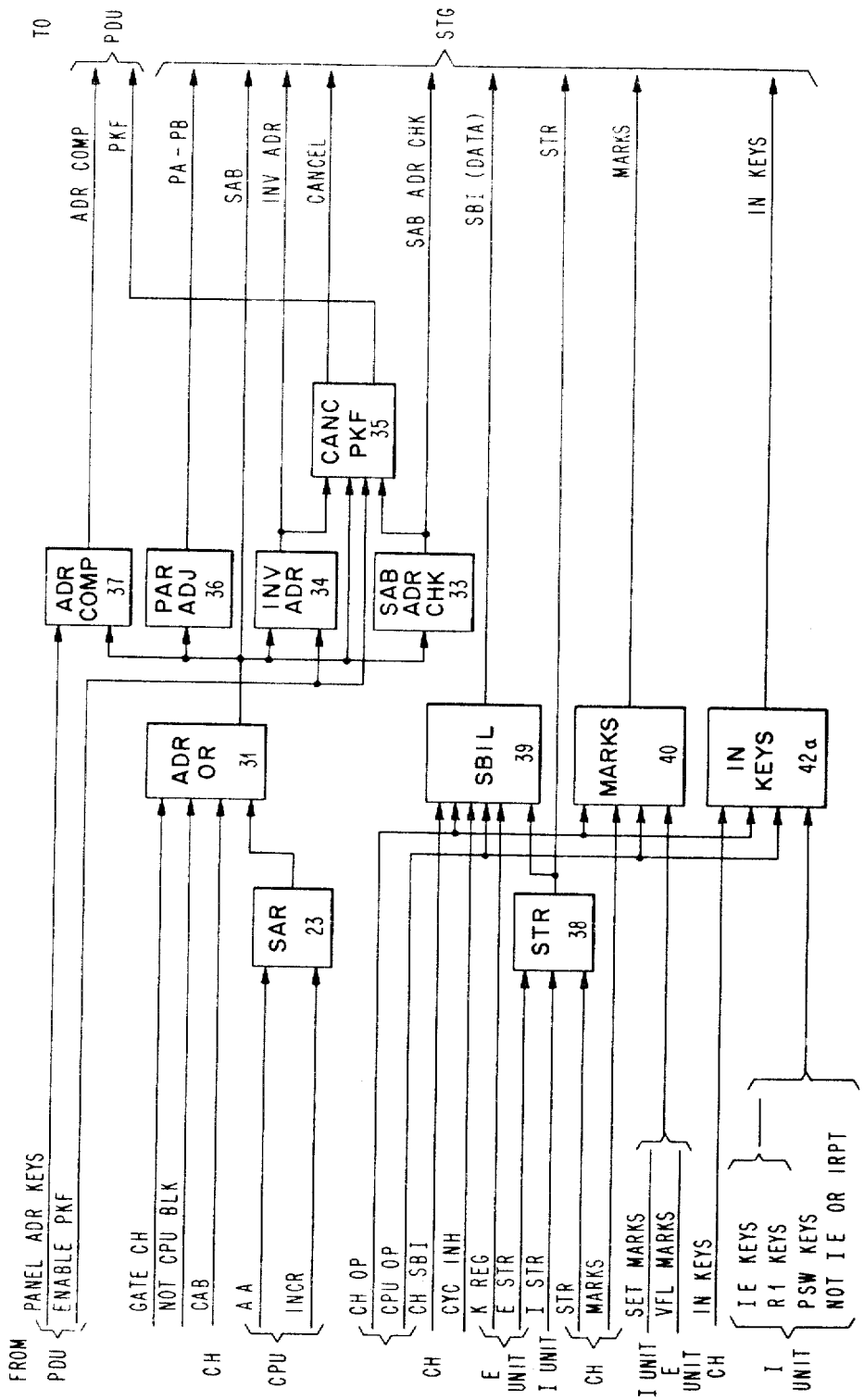
Figure 11:
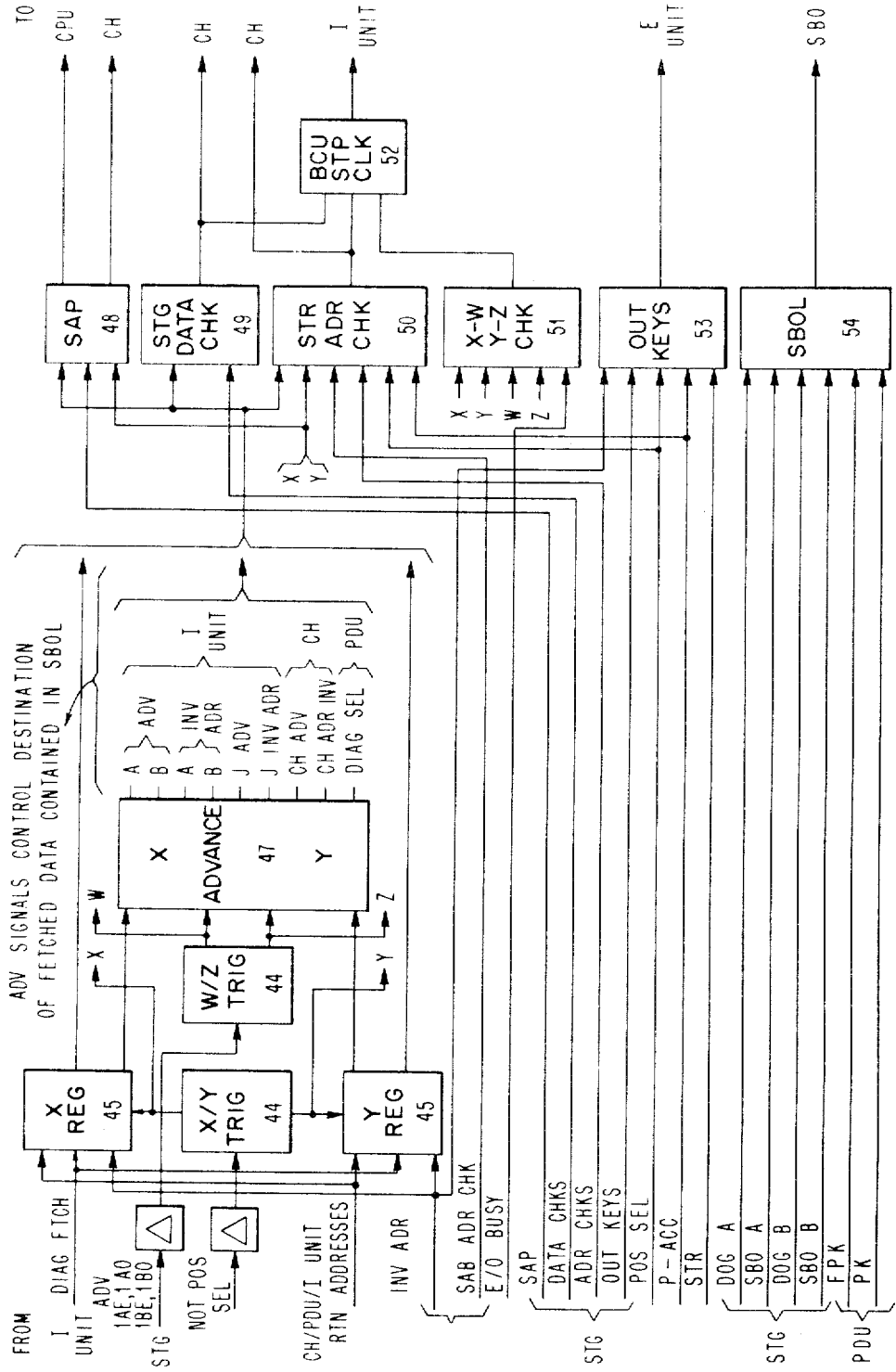

The channel even/odd selection circuit, shown in FIG. 18, determines that a valid channel request has been accepted for either an even or an odd storage unit and, when this is so, that the channel, rather than the CPU, is to be gated in various other circuits within the BCU, as indicated by the GATE CH (gate channel), NOT CPU BLK (block), CH OP (operation), and CPU OP, control signals which are utilized in the remainder of the circuits shown in block form in FIG. 9 and FIG. 10.

The channel even/odd circuits control the selection of an even or an odd storage in response to a signal on the CH REQ (request) line from FIG. 17 and a signal on a NOT CYC INH (cyclic inhibit) line from FIG. 28 described in Section 6.1.4.2, hereinafter.

The AND circuit 1 is operative in response to a signal on an EVEN NOT BUSY line which is described in Section 6.1.4.2, hereinafter. However, AND circuit 1 will not be able to respond unless the channel has indicated a desire to reference an even storage unit by virtue of the fact that the address has no bit in bit position 20, as indicated by a signal on a NOT CAB 20 (channel address bus, bit 20). The relationship of bit 20 to the addressing of storage is described in detail in Section 6.2.2, hereinafter, for now it suffices that, considering the highest ordered address bit to be bit zero and the lowest ordered bit of the address to be bit 23, (0, 1, 2 . . . 22, 23) the storage units herein are not responsive to the lowest 3 bits (bits 21, 22, 23) since these tend to select only a particular fraction of a storage word, called a byte (8 bits); therefore, the lowest ordered bit to which the storage units themselves are responsive, is bit 20. This bit has merely an even and odd significance; for instance, addressing of storage location 6 would require the same address bits as accessing of storage location 7, with the exception of the fact that bit 20 would be a ZERO if addressing location 6 and bit 20 would be a ONE if addressing location 7. The AND circuit 2 responds in a fashion similar to AND circuit 1 except that it is responsive to a signal on the ODD NOT BUSY line (indicating that the odd storage units are available) and a signal on the CAB 20 line (indicating, by a bit in address position 20 of the CAB, that the channel has requested access of an odd storage unit). The outputs of the AND circuits 1, 2 comprise signals on the CH SEL EVEN line and the CH SEL ODD line, which signals are applied to FIG. 27 for purposes to be described in Section 6.1.4.2, hereinafter. Each of these signals is also applied to an OR circuit 3 to generate a signal on the GATE CH line, which indicates that the channel (rather than the CPU) is referencing one of the storage devices. In the event that no channel selection has taken place, then an inverter 4 will generate a signal on a NOT GATE CH line, and an inverter 5 will generate a signal on a NOT CPU BLK line. The NOT CPU BLK line is utilized to permit gating of the CPU, and it is so named to emphasize the fact that the CPU will be blocked whenever the channel is selected, and otherwise, the storage units are considered to be available to the CPU. Stated alternatively, one could say that the CPU is presumed to be using the storage selection circuitry unless a channel has affirmatively taken control.

The GATE CH signal is also applied to an OR circuit 6; the OR circuit 6 will generate a signal on a CH OP line in response to the signal on the GATE CH line, or in response to a signal on the INH (inhibit) line from FIG. 28, described in section 6.1.4.2, hereinafter. The INH signal is present whenever any of the storage units has just been selected or when there is a need to prevent a storage request from being recognized due to the time synchronization in the BCU dscribed in Section 6.1.4.2 (section explaining cyclic inhibit), hereinafter. An inverter 7 will generate a signal on the CPU OP line whenever there is no signal on the CH OP line; note that this is identical to the relationship between the GATE CH line and the NOT CPU BLK line.

Thus, the channel even/odd selection circuit of FIG. 18 will permit a recognized channel to select an even or odd storage unit provided that the even or odd unit, respectively, is not busy, and this is used to indicate that the channel is to be allowed access to the storage units, and the CPU is to be blocked therefrom. The use of these signals is developed more fully in the succeeding portions of this section (Section 7, relating to the basic BCU).

*(6.1.3) CPU selection, generally (FIG. 9)*

Figure 21:
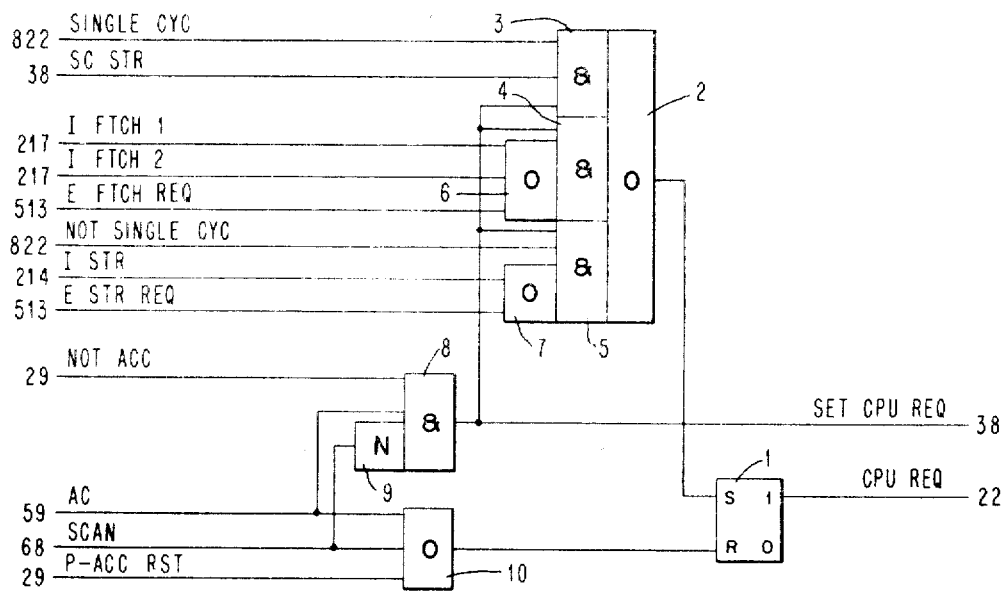
Figure 22:
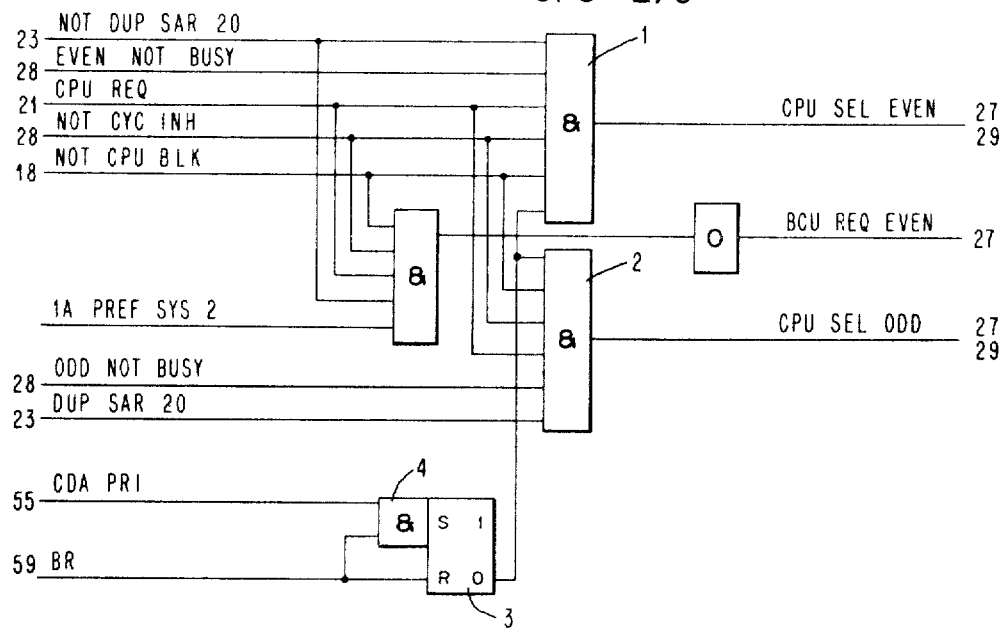

Referring to the block diagram of the selection circuits in FIG. 9, various store and fetch requests from the I unit and the E unit of the CPU will cause a CPU REQ (request) circuit, FIG. 21, to send a CPU request signal to the CPU E/O (even/odd) circuit, FIG. 22. The requesting portion of the CPU requests either an even or an odd storage unit, as indicated by the absence of presence, respectively, of the bit 20 output of the DUP SAR (duplicate storage address register) circuit, FIG. 23. If the corresponding (odd or even) storage unit is not busy, as indicated by the not busy input from the even/odd busy circuit, FIG. 28, then a valid CPU request is generated. However, if a channel request has been recognized by the CH E/O (channel even/odd) circuit, FIG. 18, then the CPU E/O circuit FIG. 22 is blocked from operating. In other words, the channel selection circuit, FIG. 18, is free to operate notwithstanding the operation of the CPU, provided the correct even or odd storage unit is available; on the other hand, the CPU selection circuit, FIG. 22, is not free to operate whenever there has been a valid selection of storage by the channel.

*(6.1.3.1) CPU request circuit (FIG. 21)*

In FIG. 21, a signal is generated on a CPU REQ line by a latch 1 which is set by an OR circuit 2 in response to any one of three AND circuits 3–5. The AND circuit 3 is operated during single cycle store operations as indicated by a signal on the SINGLE CYC (cycle) line, concurrently with a signal on the SC STR (single cycle store) line. Thus, during single cycle diagnostic operations wherein the CPU is to store data, the AND circuit 3 will initiate a CPU request. The AND circuit 4 is operated by an OR circuit 6 which responds to signals on any one of three CPU fetch lines: I FTCH 1, I FTCH 2, E FTCH REQ. The AND circuit 5 is operative, during other than single cycle operations (due to the necessity of a signal on the NOT SINGLE CYC line), to respond to an OR circuit 7 which recognizes requests from the I unit or the E unit to store data, due to the signals on the I STR or E STR REQ lines. Each of the AND circuits 3–5 is gated with a signal on a SET SPU REQ (request) line generated by an AND circuit 8, which is operative at A time (due to a signal on the AC line), provided that a SCAN operation is not being performed (inverter 9), and further provided that no accept condition exists as indicated by the signal on the NOT ACC line. The NOT ACC line indicates that the CPU has not recently been granted access to storage, thus indicating that a CPU request, if honored by the BCU, will not interfere with any other previous CPU request. The development of this signal is discussed in Section 7.1.4.3, of application Ser. No. 609,238.

The latch 1 is reset by an OR circuit 10 in response to a signal on the AC line, to a signal on the SCAN line, or to a signal on a P-ACC RST (pulse accept reset) line (which is developed in FIG. 29) and which indicates generally that the need to block further CPU requests has passed, and that the CPU selection circuits are therefore to be prepared for further requests. It is to be noted that the timing control for the CPU REQ circuit of FIG. 21 is an AC (controlled A clock) signal, which means that, during single cycle diagnostic procedure, the CPU REQ circuit can be set or reset only when an active single cycle is generated by an operator.

In summation, a CPU REQ may be instituted by a single cycle storage operation, by any CPU fetch operation, or by CPU store operations other than single cycle. Subsequent requests will be blocked and a current request is cut off when previous requests have set the accept latch, and are reset when the accept latch is reset.

The CPU request latch is gated with NOT ACC primarily for single cycle operations, and also just to be sure, should there be a very long I fetch or E fetch or I or E store request, that as soon as the request has been honored as is indicated by an accept signal, this will block further pasage of this long request through the OR circuit 2 to the latch 1 so that this latch can be reset in a timely fashion. Note particularly that although NOT ACC is used to block the AND circuits 3–5, P–ACC RST is used to reset the circuit since it will be running at all times. Thus in a single cycle operation, as soon as the accept latch is set, a NOT ACC will disappear and block the AND circuits, thus cutting off a long single cycle store request. However, the P–ACC set is controlled by a running clock pulse, and is therefore available throughout single cycle operations, and permits the CPU request latch to be reset when in fact the work has been done.

Referring to the timing diagram of the P–ACC latch and the reset of the CPU request, notice of the CPU request latch will be reset at AC time in the third cycle during a non-single cycle operation since the AC pulse will appear the second time and that each cycle is independent insofar as CPU requests are concerned. For instance, supposing a branch operation took place, the branch location having been fetched and now the branch +1 location is being fetched, but in the meantime it was learned that the branch was not successful and that therefore this was not desired. If the initial request had not been accepted due to busy storage units, then this lack of desire for the branch plus one location will cause a termination of the I fetch which had requested storage and therefore on the next cycle the latch will not be again set so that it will remain reset, thus avoiding the necessity of taking this redundant storage cycle. Another example of the value of the CPU request reset circuit and set circuit combination is in an interrupt situation. It speeds the handling of the interrupt if a redundant and worthless CPU request which related to the program prior to interrupt is not required; thus, if a request has not been accepted prior to the time that the interrupt is effective, then it will not be accepted in the following cycle due to the fact that the request will have been removed and the latch is reset for a few nanoseconds of time. Therefore, this redundant storage cycle is avoided.

In FIG. 22, a signal is generated on a CPU SEL (Select EVEN line by an AND circuit 1, or a signal is generated on a CPU SEL ODD line by an AND circuit 2, alternatively. Both of the AND circuits 1, 2 respond to a signal on the CPU REQ line, to a signal on a NOT CYC INH (not cyclic inhibit) line, to a signal on the NOT CPU BLK line, and to a signal on the NOT CDA (CHAINED DATA ACCESS) LINE. The lack of a signal on the NOT CPU BLK line indicates that a channel storage selection has just taken place. The lack of a signal on the NOT CDA line indicates that, although the CPU might normally be able to take the next storage cycle, due to the queing of chained data in a channel, the channel is operating at a high rate of speed, and has need for multiple rapid accesses of storage. The NOT CDA signal is generated by the off-side of a latch 3 which is set by an AND circuit 4 whenever a channel sends a signal on a CDA PRI (priority) line.

Figure 28:
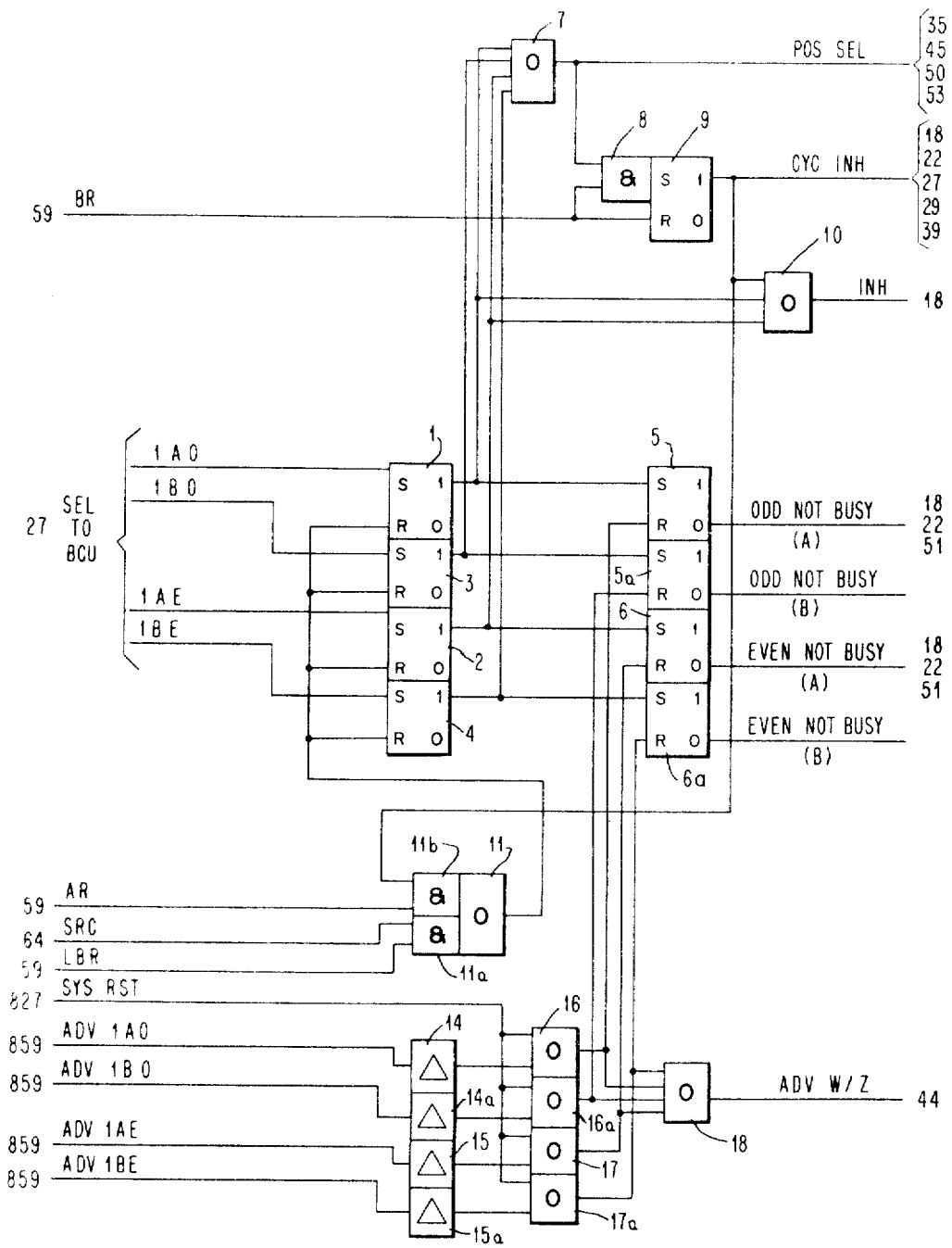

The AND circuit 1 will operate if there is a signal on the NOT DUP SAR 20 line (indicating a ZERO in the bit 20 position of the duplicate storage address register) concurrently with a signal on the EVEN NOT BUSY line from FIG. 28 (the same line which is fed to the AND circuit 1 in FIG. 18). Similarly, the AND circuit 2 will operate if there is a signal on the ODD NOT BUSY line and a signal on the DUP SAR 20 line (indicating a ONE in the bit 20 position of DUP SAR).

Inasmuch as the CH E/O circuit, FIG. 18, controls whether the channel or the CPU will be allowed a storage request, the CPU E/O circuit shown in FIG. 22 is therefore much simpler. Thus, in addition to the CPU REQ and NOT CYC INH inputs to the AND circuits 1 and 2, the CPU E/O circuit of FIG. 22 has other inputs (for which there are no counterpart inputs in the CH E/O circuit of FIG. 18, which relate to the channel usage of the storage circuits.

*(6.1.4) CH CPU selection circuits, generally (FIG. 9)*

Figure 27:
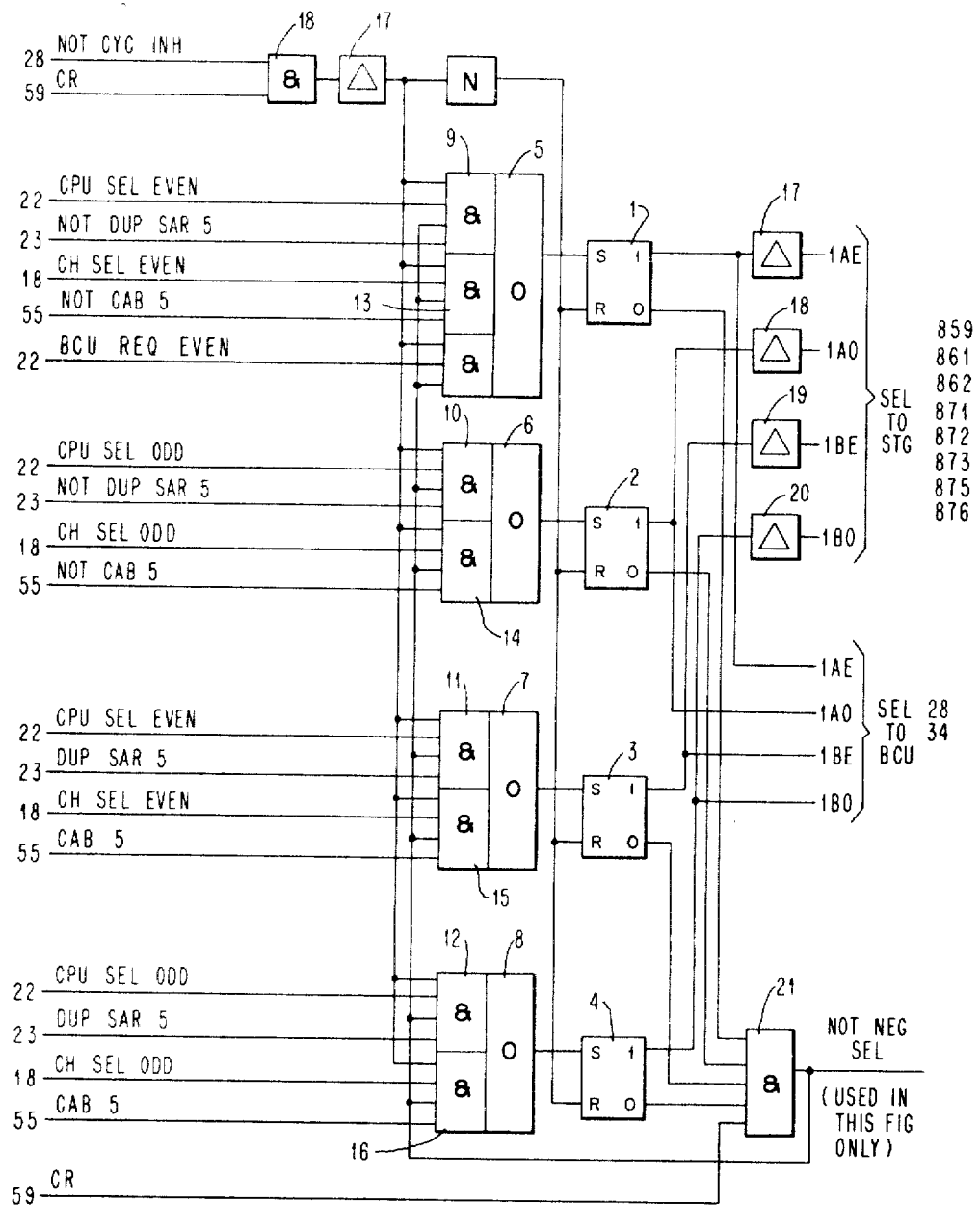

The CH E/O circuit, FIG. 18, and CPU E/O circuit, FIG. 22, each feed the CPU CH SEL A/B E/O circuit, FIG. 27. This circuit responds to some combination of either the channel or the CPU, with even or odd (only one of the 4 possible signals will be available), and matches this with the proper storage address information to determine whether storage 1AE, 1AO, 1BE, or 1BO is to be selected. In the addressing of the storage units, address bit 5 (sixth from highest-ordered) denotes either the lowest address storage frame (the storage frame containing storage units 1A EVEN and 1A ODD) or the high-address storage frame (storage units 1B EVEN and 1B ODD), in dependence upon the absence or presence, respectively, of address bit 5. This is so because bits 6 through 20 are effective to select a particular location from either storage frame, and bit 5 indicates either the low-address or the high-address storage frame; for instance, 16,384 words can be specified by an address comprising fourteen bits, in binary form, the fourteen bits comprising bits 6 through 19; as described hereinbefore, bit 20 permits selecting between the even and odd portion of a storage frame, thereby providing the ability to select any one word out of 32,768 words, the amount which is contained in any one storage frames (storage 1A even and odd, or storage 1B even and odd). By adding an additional, high order binary bit to the address, the number of addressable locations is doubled, granting access to 65,536 words, the amount which is within all four of the storage units within the two storage frames. As used herein, therefore, bit 5 is used to select between the high order frame (1B) and the low ordered frame (1A) as described above. Selection of one of the storage units by the CPU-channel select A/B–even/odd circuit, FIG. 27, will cause either an even or odd busy trigger to be set in the even/odd busy circuit, FIG. 28, which in turn generates a positive select signal in the circuit, FIG. 28; positive select will cause cyclic inhibit and inhibit to be generated in the CYC INH–INH circuit, FIG. 28. The absence of a cyclic inhibit signal together with a CPU select even signal or a CPU select odd signal will cause an accept and a pulse accept signal to be generated in the ACC circuit, FIG. 29; this in turn causes CPU communicate and CPU busy signals to be generated in the CPU COM–BUSY circuit, FIG. 30. Additionally, as before described, the INH circuit, FIG. 28 and the GATE CH circuit, FIG. 18, operate the CH OP/CPU OP circuit, FIG. 18.

*(6.1.4.1) Channel—CPU selection A/B—even/odd (FIG. 27)*

The storage selection circuit of FIG. 27 comprises a plurality of latches 1–4 which are set by corresponding OR circuits 5–8 each of which is responsive to a corresponding CPU AND circuit 9–12 or a corresponding Channel AND circuit 13–16, respectively. Each of the AND circuits 9–16 is gated by the output of a 50 ns. delay unit 17 (at about early B time), in response to an AND circuit 18 responsive to a signal on the NOT CYC INH line from (FIG. 28) concurrently with a C running timing signal on the CR line. Each of the AND circuits must also be gated with a signal on a NOT NEG SEL line (described in this section, hereinafter). Otherwise, each AND circuit 9–16 operates in response to a peculiar combination so as to select one of the storage units, a pair of AND circuits corresponding to each of the OR circuits 5–8 comprising similar inputs for the CPU and for the channel, respectively. For instance, the latch 2 is set by the OR circuit 6 in response to an AND circuit 10 if there is a signal on the CPU SEL ODD line, provided that the low-addressed storage frame is being accessed as indicated by a signal on the NOT DUP SAR 5 line. This will cause accessing of storage unit 1AO. Alternatively, the OR circuit 6 could be operated to access storage 1AO provided that there is a signal on the CH SEL ODD line and there is a signal on the NOT CAB 5 line (indicating that there is no bit in the sixth bit position of the channel address bus code configuration being presented to the BCU). The remaining ones of the circuits 9–16 operate in a similar, obvious manner, so that either the channel or the CPU will select any one of the four storage units: whether it is to be even or odd being determined by the channel even/odd circuit of FIG. 18 or the CPU even/odd circuit of FIG. 22, and whether it is to be in the low-address frame (storage 1A) or the high-address frame (storage 1B) being determined by bit 5 of the incoming address (either the SAR or the CAB in dependence upon the CPU or the channel, respectively, being granted permission to access storage). The permission to access storage is actually controlled at the channel even/odd circuit, FIG. 18: if the channel does select even or odd, then the CPU is precluded from making a selection. The only thing that could preclude the channel from selecting the even or odd is that the appropriate storage unit (whether selected previously by CPU or by channel) is busy, or that the NOT NEG SEL signal is absent, as described hereinafter. The in-phase outputs of the latches are used directly as select signals within the BCU (in FIG. 28) to generate busy, positive select, and inhibit signals. The select signals are also applied to corresponding delay units 17–20 to generate select signals for actually operating the storage units, the amount of delay in each of the delay units 17–20 being dependent upon the actual physical layout of the respective storage units with respect to the BCU. The out of phase output of each of the latches is fed to an AND circuit 21 which will generate the signal on the NOT NEG SEL line during a CR clock pulse when none of the latches have been set, which fact indicates that there is not a current selection already in progress and that therefore a selection can be made; alternatively speaking, the absence of the signal on the NOT NEG SEL line indicates that the selection circuit is currently busy, and no further request from either the CPU or the channel can be recognized by the circuit of FIG. 27 at that time.

The lack of NOT NEG SEL prevents a circuit race when the CPU REQ latch and CH REQ latch come on in the same cycle and storage is not busy; CPU is gated into FIG. 27. At early B time (delayed CR); and CH SEL is therefore blocked when it comes on at B time. Notice that the timing input to this circuit is a running clock pulse, CR; this is due to the fact that a channel operation may be involved, and as before described, should single cycle operation of the CPU cause channel operation to service the CPU, the channel operation is handled in a normal fashion.

(6.1.4.2) Busy, positive select and inhibit circuits (FIG. 28)

The circuit of FIG. 28 centers around a set of latches 1, 2, 3 and 4, which are operated by signals on the SEL 1AO, SEL 1BO, SEL 1AE, and SEL 1BE lines, respectively.

(6.1.4.3) Accept circuit (FIG. 29)

The accept circuit shown in FIG. 29 comprises primarily a pair of latches 1, 2 the circuitry of each being identical to the other with the exception of the fact that circuitry related to latch 1 is operated under the control of a controlled clock pulse AC and the computer reset control CRC, whereas the latch 2 is operated by the running clock pulse AR and the system reset control SRC; both circuits respond to the running early B pulse. Thus, the signal on the accept line reflects single cycle operation and computer reset, whereas the signal on the P-ACC line does not reflect computer resets, but only system resets, and is not aware of single cycle operation due to the use of the running clock pulse.

An AND circuit 3 responds to a signal on the NOT CYC INH line from FIG. 28 at early B time, due to the signal on the EBR line; a CR line is provided to AND circuit 3 to pre-condition the circuit for fast response at early B time. This is done to alleviate any timing problems that could occur if the CPU even/odd circuits have slower response time than expected and therefore would require delaying the early B time. This could cause a slivered accept signal on a cycle in which storage was not selected. The output of the AND circuit 3 is used to gate a pair of AND circuits 4, 5 either of which may operate an OR circuit 6. The AND circuit 4 is operative if there is a signal on the CPU SEL EVEN line, and the AND circuit 5 is operative when there is a signal on the CPU SEL ODD line. The output of the OR circuit 6 will set the latches 7, 8 which correspond respectively to latches 1, 2. The output of the latches 7, 8 comprise the accept, and pulse accept signals; the remainder of the circuitry generates only the reset signals for the latches 7, 8. Each of the latches 1, 2 will be set at A time following the setting of the corresponding latch 7, 8 but the output of the latches 1, 2 will not be used until the following early B time. Therefore, each of the latches 7, 8 is reset near the start of early B time next following when the latch was set. It should be noted that the OR circuit 6 which sets the latches 7, 8 will be operated by the AND circuit 3, the critical timing of which is also early B time of one cycle, and then the related latches 1, 2 will be set at the following A time; this in turn causes the respective latches 7, 8 to be reset at the following early B time. The latches 7, 8 are therefore on for approximately one machine cycle (200 nanoseconds). The reason for the difference between accept and pulse accept is: during single cycle operation the CPU would not be able to recognize an accept signal that was on for only 200 nsec. (one cycle). Single cycle rate is controlled by a pushbutton. Thousands of storage selections can occur between two successive single cycles, yet the CPU has only made one request. Thus, the BCU resets accept under single cycle control; this retains the fact that the selection has occurred.

(6.1.4.4) CPU communicate-busy circuit (FIG. 30)

In FIG. 30, a pair of latches 1, 2 are set by corresponding AND circuits 3, 4 to generate signals on a CPU COM (communicate) line and on a CPU STG BUSY (storage busy) line, respectively. The AND circuit 3 is responsive to a signal on a P-ACC line at B time, and the AND circuit 4 responds to an OR circuit 5 so as to be operated by a signal on the P-ACC line at early B time (EBR). The OR circuit 5 is also operated by the signal on the CPU COM line. The purpose of the signals generated in FIG. 30 are to indicate to the storage device that the CPU is the device being serviced, and to indicate to the CPU that it is busy with a storage operation, respectively. The latch 1 is set on the rise of the B clock pulse and remains set until the rise of the following B clock pulse; similarly, the latch 2 is set from the start of early B until the start of the next early B; both latches are set as soon as the P-ACC signal appears. The reason for using the OR circuit 5 in setting the latch 2 is to bring up CPU STG BUSY within the same cycle in which ACC comes on and to maintain CPU STG BUSY one cycle after P-ACC goes off by means of the CPU COM latch 1.

Figure 23:
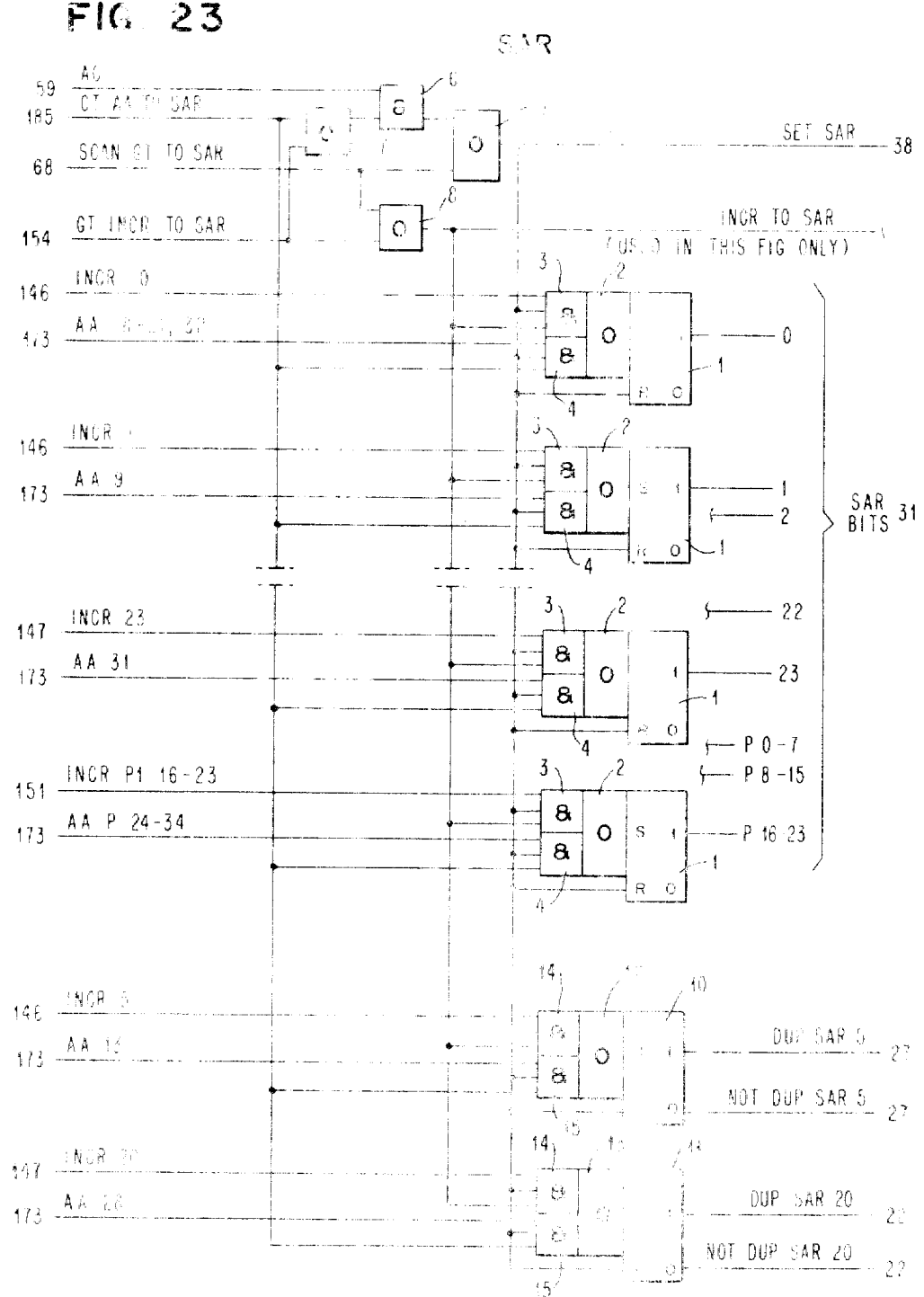

(6.1.5) Storage address register (FIG. 23)

The storage address register shown in FIG. 23 comprises essentially a plurality of latches 1 each of which is set by a corresponding OR circuit 2 responsive to either one of two respective AND circuits 3, 4. Each of the AND circuits 3, 4 responds to a signal on a SET SAR line generated by an OR circuit 5 due to the presence of a signal on a SCAN GT TO SAR line or the output of an AND circuit 6. The AND circuit 6 is operative at A time in response to an OR circuit 7 which in turn responds to a signal on a GT INCR TO SAR line or a signal on a GT AA TO SAR line. Thus, whenever the incrementer or the address adder are to be gated into the storage address register, the AND circuit 6 will cause the AND circuit 5 to do this at A time. On the other hand, the OR circuit 5 will provide a gating signal to SAR whenever the SCAN GT TO SAR line has a signal thereon. The AND circuits 3 are additionally gated by a signal on an INCR TO SAR line from an OR circuit 8 which is responsive to either the SCAN GT TO SAR line or the GT INCR TO SAR line. The AND circuits 4 are responsive to a signal on the GT AA TO SAR line.

Note that the source of bits for SAR are bits 0 through 23 of the INCR (the incrementer) or bits 8 through 31 of the AA (addressing adder). Only the low order 24 bits (bits 8 through 31) of the addressing adder output are required as addresses in this case. (See said illustrative environmental system described in application Ser. No. 609,238 in which the addressing adder is described for further details as to the bits of the addressing adder which are used to generate storage addresses.) The circuit of FIG. 23 also includes a duplicate storage address register (DUP SAR) which comprises only two latches 10, 11 each set by a corresponding OR circuit 12, 13 in response to a pair of respective AND circuits 14, 15. These circuits 10–15 are identical to the circuits above, and relate only to SAR bits 5 and 20, the OR circuit 14, relating to SAR bit 5, being set by INCR 5, the OR circuit 14, relating to SAR bit 20, being set by INCR 20; the AND circuit 15, relating to SAR bit 5, being set by AA 13; and the AND circuit 15, relating to SAR bit 20, being set by AA 28. The relationship between the AA bits and the INCR bits is the same in the DUP SAR as it is in the SAR, above.

The reason for having SAR and DUP SAR is that in the embodiment herein described, the SAR is physically remote from the DUP SAR (in roughly the same fashion as illustrated with respect to the block diagrams: the SAR appearing in FIG. 10 and the DUP SAR appearing in FIG. 9). As it happens, there is plenty of time to get the input bits to the SAR, but once SAR is set, the timing is rather critical insofar as using SAR bits in FIG. 9, whereby it is preferable to provide these SAR bits directly by means of a DUP SAR so that as soon as they are set therein, they are immediately available without circuit propagation time delays being involved.

(6.1.6) Summation of selection circuits

The selection circuits shown in the block diagram of FIG. 9 comprises essentially four portions. In the upper left hand corner, the channel priority circuit FIG. 12 through FIG. 16 and channel request and selection circuits FIG. 17 and FIG. 18 will recognize a channel (the highest priority channel which has requested a storage reference) and generate a channel select even or odd signal. The second part of the selection circuit includes the CPU request and CPU select even/odd circuits of FIG. 21 and FIG. 22 which recognize fetch and store operations from different parts of the CPU and generate a CPU select even (or odd) signal. The third part of this circuit includes the CPU-channel select A/B—even/odd circuit, FIG. 27, and its dependent circuit, FIG. 28, which generates even/odd not busy, the positive select, the cyclic inhibit and the inhibit signals. These circuits respond to either a channel or a CPU selection of even or odd to select the proper storage frame (1A or 1B) and then generate signals indicative of the fact that a storage selection has been made. The final portion of FIG. 9 relates only to the CPU and includes the accept circuit of FIG. 29 which recognizes that a CPU selection has been made, and the CPU communicate and busy circuits which are merely timing variations of the accept signal.

The channel priority circuits, particularly the circuits of FIG. 12 and FIG. 13 are so arranged as to select one and only one channel, having highest priority, at the last possible minute. It is, for instance, possible for the priority circuits to have a channel selection process started by one channel, with a channel request latch 1 (FIG. 12) latched for a first, lower-priority channel, and later have the circuit taken over by a higher-priority channel.

Assume that channel 6 has been attempting to make a storage reference but has been prevented from doing so by repetitive requests from channel 1. Eventually, at the end of the last channel 1 request, the priority reset will reset the circuits of FIG. 12 and FIG. 13. On the following A time, the presence of a not buffer signal will permit a signal on the AR line to cause the AND circuit 3 to gate the latches 1. Thus the latch 1 corresponding to channel 6 will become set, and since no higher channels are set, there will be a channel 6 priority bit passed to the buffer circuit in FIG. 13. However, due to the AND circuit 2 (FIG. 13) the buffer trigger 1 (FIG. 13), cannot be set until B time due to the presence of the BR line. If, during the remaining part of the AR clock pluse (which gates the circuits of FIG. 12, the channel 2 request line became activated, then the latch 1 (FIG. 12), corresponding to channel 2 will become set. In this situation, there will therefore be two latches set, one for channel 2 and one for channel 6. However, as soon as channel 2 is set, the AND circuit 5 (FIG. 12) will become blocked so that the AND circuit 4 corresponding to channel 6 will become blocked and there will be no output on the channel 6 priority bit. By this time, however, the OR circuit 4 (FIG. 13) is being gated by the channel 2 priority bit so that when B time arrives, a signal on the BR line will cause the AND circuit 2 (FIG. 13) to set the buffer trigger latch 1 (FIG. 13).

Note further that the timing as between the latches of FIG. 12 and the buffer trigger of FIG. 13 is such that there is no possibility of attempting to set one of the latches 1 (FIG. 12) after the end of A time, and that there is approximately a 50 ns. delay between that time and the time that the buffer trigger 1 (FIG. 13) can be set by the OR circuit 4 (FIG. 13) with a BR clock pulse. Thus, it is impossible for noise on the channel priority lines, or for a very late channel priority request which doesn't quite get one of the latches 1 (FIG. 12) fully established in a set condition, to cause the buffer trigger to be set. The buffer trigger will be set only if one of the latches 1 (FIG. 12) is definitely set. Once the buffer trigger 1 (FIG. 13) is set, no further request will be gated into the latches 1 (even though several subsequent AR timing signals will be received) since the AND circuit 3 (FIG. 12) is blocked by the lack of a NOT BFR signal. This permits use of these priority circuits with channels which are capable of generating a storage reference request once in every micro-second, but which, except when operating at maximum speed on a cyclic basis, may request storage accesses on a completely random basis, completely asynchronously with respect to the BCU.

Thus, the channel priority circuits herein provide essentially first come-first serve priority for asynchronous circuits in a synchronous BCU, with last minute recognition of the highest priority request, all other request being blocked out during the period of time that a particular channel request is manifested so as to send signals back to the selected channel and thereby permit that channel only to communicate with the BCU for a storage reference.

Concerning CH/CPU switching—

Referring to FIG. 19 the gate channel signal is latched and remains latched until there is a signal on the NOT INH line to generate the channel OP signal. Inhibit is essentially cyclic inhibit which has been speeded up by adding positive select to it. Stated otherwise, it is POS SELECT held up longer with cyclic inhibit.

The purpose of INH is to have it available to the CH OP latch (by *not* having the NOT INH) just prior to the time that CYC INH appears to block the channel select even/odd inputs (AND circuits 9–16, FIG. 27). Thus INH controls the latch which generates CH OP and thereby permits the CH OP to be available for gating purposes later than GATE CH is available.

A storage cycle begins at B time in every case. When initiated by a channel, the storage cycle begins one machine cycle after the CH REQ latch (FIG. 18) is set; when the result of the CPU REQ latch, the storage cycle begins less than half a machine cycle after the CPU REQ latch is set. This means that there is more time in a channel-initiated sequence than there is in a CPU-initiated sequence, for switching all the circuits (see FIG. 9–FIG. 11) from channel to CPU, or vice versa. Therefore, the CPU is always gated in the absence of a recognized channel request. Whenever the CH REQ latch is set, it then switches all required circuits from the CPU to the channel. The time for this switching therefore falls within a channel selection operation rather than within the shorter CPU selection operation.

Figure 24:
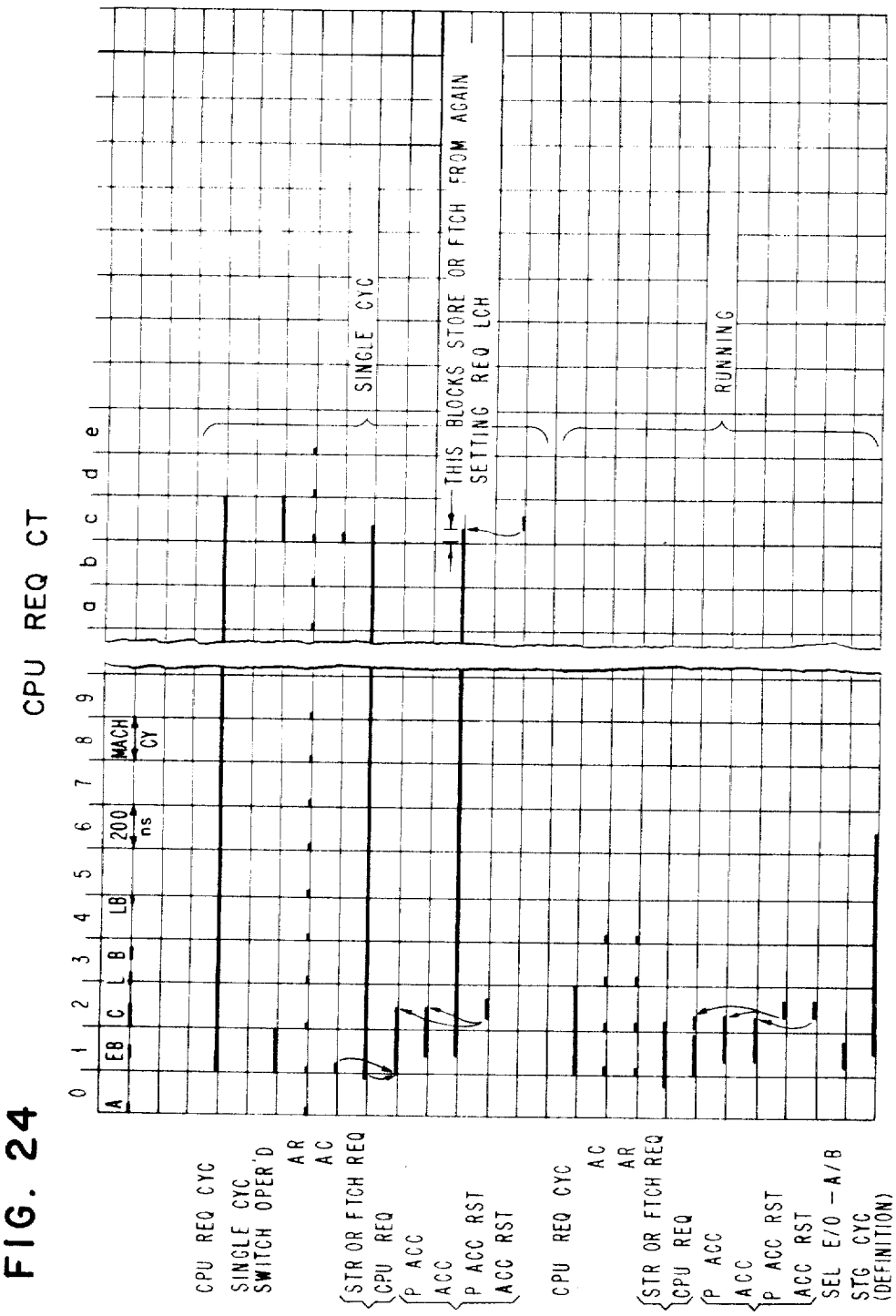
Figure 25:
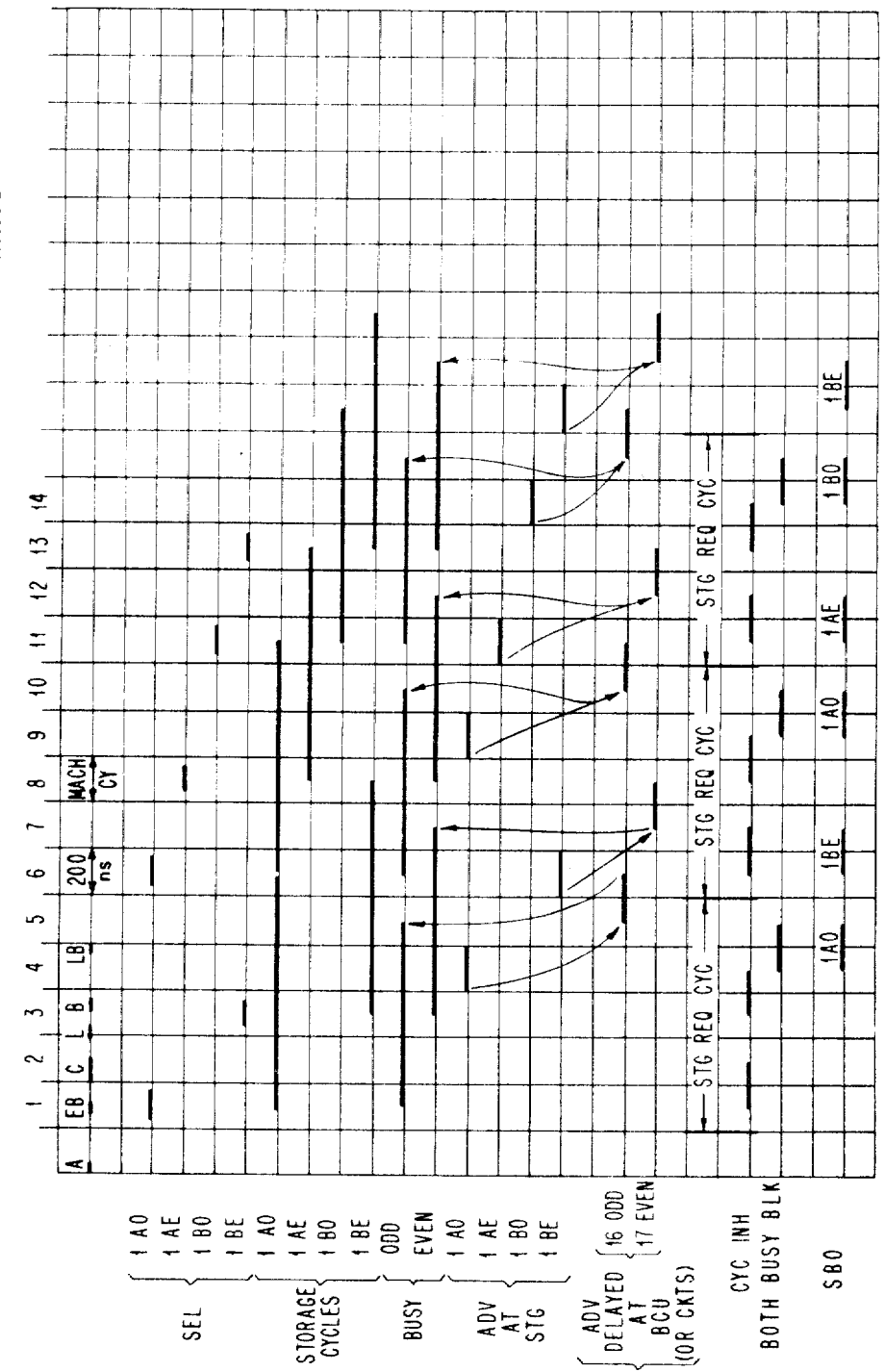

In FIG. 24, two types of CPU request cycles are illustrated. In the upper part of the figure, a request cycle made during single cycle operations (maintenance type operations wherein the operator depresses a key each time that an additional 200 ns. machine cycle is to occur). Due to the relationship of the ACC (accept) and the P-ACC (pulse accept) circuitry of FIG. 29 (which controls the basic CPU request cycle as illustrated in FIG. 24), a CPU request cycle requires two A controlled clock pulses, one to set the cycle and one to reset it; this is due to the fact that the CPU request latch (FIG. 21) is both gated (through the ANDs 3–5 and the OR 2) and reset (through the OR 10) in response to an AND circuit 8 which requires a controlled A clock pulse on an AC line. In the upper part of FIG. 24, it is assumed that a single cycle operation is taking place. Each time that a single cycle switch is operated there will be one AC pulse. Therefore, a CPU request cycle during single cycle operations will take up to several seconds to be competed. Contrarywise, during normal operations when the machine is running, there will be an AC signal during each machine cycle and therefore the CPU request cycle requires only two machine cycle (400 ns.).

One of the features of the present invention is the ability of the CPU request latch to avoid taking useless storage cycles when a branch or an interrupt causes a change in the operation of the machine such that a particular storage access is no longer needed (as indicated by the loss of an I FETCH 1, E STORE, or other input to FIG. 21). The CPU request latch is set and reset by an A controlled clock pulse. This is due to the fact that there is a longer circuit path to the set input from the AC signal than three is to the reset input; thus, when the AC signal first appears it will reset the latch, and there will be a blocking of the inputs for a span of one or two nanoseconds sufficiently to let the latch reset. After that, as soon as the circuit delays are used up, the inputs will again be gated to the latch and the setting will take precedence over the resetting so the latch will again become set.

Figure 26:
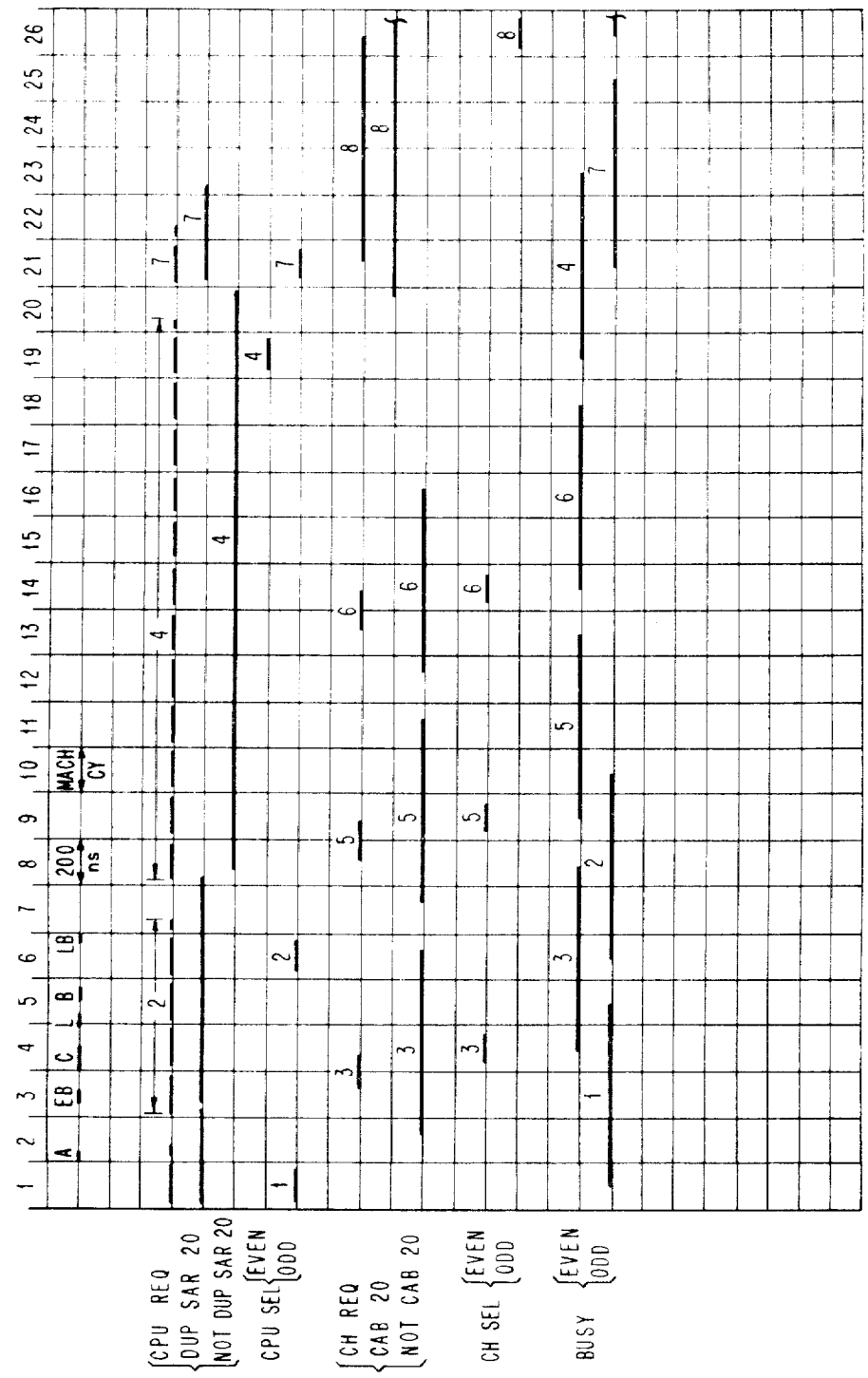

The timing of the CPU request cycle (including the fact that during running operations the CPU request latch is reset momentarily at the start of each machine cycle) is shown in FIG. 24; however, the usefulness of this resetting action is illustrated most clearly in the top line of FIG. 26. In FIG. 26, it can be seen that the second and the fourth CPU requests are not honored immediately; were it not for the fact that the CPU request latch can be reset, at the start of each cycle, any CPU request which is manifested in the latch would eventually result in a storage reference, even though it may be many machine cycles later. Of course, it would be possible to take some faction of a branch or an interrupt signal and from it develop an appropriate resetting signal for the CPU request latch. However, the usage of this particular circuit makes the CPU request latch capable of being reset upon branch or interrupt (due to the removal of the remaining inputs such as I FETCH, E FETCH, I STORE, etc.) without regard to what is occurring within the CPU. This makes the BCU more versatile, and for instance, lends its use in multiple-computer operations wherein more than one computer may be utilizing the particular BCU for referencing storage devices. Stated alternatively, upon branch of interrupt which causes a loss of the storage access request (I FETCH 1, I FETCH 2, E FETCH, I STORE or E STORE) the loss of these signals act as a reset for the CPU request without any particular other reset signal being required.

Sections 6.2 through 22.0 are shown in said environmental system, referred to in Section 2.0 herein.

While the invention has been shown and described with respect to an illustrative embodiment thereof, it should be apparent to those skilled in the art that various changes and omissions in the form and detail may be made therein without departing from the spirit and the scope of the invention, which is to be limited only as set forth in the following claims.

We claim:

1. A response control for a data processing system, comprising:
    a plurality of channels, each of said channels operable to present a request signal;
    priority means responsive to each of said request signals to generate a selected one of a plurality of channel storage request signals in dependence upon the corresponding channel being selected thereby;
    a plurality of delay lines connected in a serial hook-up to generate a related sequence of signals;
    means responsive to any one of said channel storage request signals to transmit a signal through said delay lines;
    means responsive to the selected one of said channel storage request signals and to a corresponding selected output from said delay line serial hook-up to send a response signal to the corresponding one of said channels;
    and channel reset means for sending a reset signal in response to said response signal to reset said priority means.

2. The device described in claim 1 wherein said priority means is nonresponsive to further request signals once it has generated a channel storage request signal until the operation of said reset means.

References Cited

UNITED STATES PATENTS

| | | | |
|---|---|---|---|
| 3,025,498 | 3/1962 | Blodgett | 340—172.5 |
| 3,099,818 | 7/1963 | Murray | 340—172.5 |
| 3,154,771 | 10/1964 | David et al. | 340—172.5 X |
| 3,158,844 | 11/1964 | Bowdle | 340—172.5 X |
| 3,231,865 | 1/1966 | Wilenitz | 340—172.5 |
| 3,283,306 | 11/1966 | Patrusky | 340—172.5 |
| 3,309,671 | 3/1967 | Lekven | 340—172.5 |

PAUL J. HENON, *Primary Examiner.*

ROBERT C. BAILEY, *Examiner.*

P. R. WOODS, *Assistant Examiner.*